US011487363B2

(12) United States Patent
Hof et al.

(10) Patent No.: US 11,487,363 B2
(45) Date of Patent: Nov. 1, 2022

(54) GESTURE DETECTION IN INTERSPERSED RADAR AND NETWORK TRAFFIC SIGNALS

(71) Applicant: QUALCOMM Incorporated, San Diego, CA (US)

(72) Inventors: Eran Hof, Haifa (IL); Amichai Sanderovich, Atlit (IL); Evgeny Levitan, Haifa (IL); Ariel Sagi, Haifa (IL); Evyatar Hemo, Kiryat Bialik (IL); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 16/935,576

(22) Filed: Jul. 22, 2020

(65) Prior Publication Data

US 2021/0034160 A1 Feb. 4, 2021

Related U.S. Application Data

(60) Provisional application No. 62/880,079, filed on Jul. 29, 2019.

(51) Int. Cl.
| | |
|---|---|
| *G06F 3/01* | (2006.01) |
| *H01Q 1/32* | (2006.01) |
| *H04B 7/0426* | (2017.01) |
| *G01S 13/72* | (2006.01) |
| *G01S 7/41* | (2006.01) |

(52) U.S. Cl.
CPC .............. *G06F 3/017* (2013.01); *G01S 13/72* (2013.01); *H01Q 1/3233* (2013.01); *H04B 7/043* (2013.01); *G01S 7/415* (2013.01)

(58) Field of Classification Search
CPC ................... G06F 3/017; G06F 3/0416; G06F 2203/04101; G01S 13/72; G01S 7/415; H01Q 1/3233; H04B 7/043
See application file for complete search history.

(56) References Cited

U.S. PATENT DOCUMENTS

| | | | |
|---|---|---|---|
| 10,302,548 B2* | 5/2019 | Hasegawa | ........... G01N 15/1456 |
| 11,087,115 B2* | 8/2021 | Baheti | ........................ G01S 7/35 |
| 2006/0058035 A1* | 3/2006 | Tsuruno | ............... H04B 17/382 |
| | | | 455/67.11 |
| 2012/0092284 A1* | 4/2012 | Rofougaran | ............ G06F 3/017 |
| | | | 345/173 |

(Continued)

*Primary Examiner* — Grant Sitta
(74) *Attorney, Agent, or Firm* — Qualcomm Incorporated

(57) ABSTRACT

Techniques for performing gesture recognition with an electronic device are disclosed where the electronic device has a wireless communications capability using beamforming techniques and includes a plurality of millimeter wave antenna modules, each antenna module including at least one transmit antenna and at least one receive antenna, the antennas being operable in one or more frequency ranges greater than 20 GHz. Performing gesture recognition includes: simultaneous operation of the at least one transmit antenna and the at least one receive antenna so as to provide a radar capability; and detecting a presence and motion of a reflective object by analyzing magnitude and phase of signals received by the at least one receive antenna and resulting from reflection of signals transmitted by the transmit antenna and reflected by the reflective object.

28 Claims, 17 Drawing Sheets

(56) References Cited

U.S. PATENT DOCUMENTS

| | | | | |
|---|---|---|---|---|
| 2012/0094594 A1* | 4/2012 | Rofougaran | ............ | G06F 1/1626 |
| | | | | 455/556.1 |
| 2013/0281024 A1* | 10/2013 | Rofougaran | ............ | G06F 1/1626 |
| | | | | 455/63.1 |
| 2013/0300605 A1* | 11/2013 | Celentano | ................. | H01Q 3/30 |
| | | | | 342/372 |
| 2015/0198697 A1* | 7/2015 | Kishigami | ............. | G01S 7/2923 |
| | | | | 342/145 |
| 2015/0198700 A1* | 7/2015 | Morita | ................... | G01S 13/284 |
| | | | | 342/59 |
| 2016/0041618 A1* | 2/2016 | Poupyrev | ................. | G01S 7/415 |
| | | | | 342/61 |
| 2016/0178730 A1* | 6/2016 | Trotta | .................... | G01S 13/931 |
| | | | | 342/175 |
| 2017/0090011 A1* | 3/2017 | West | ....................... | G01S 13/426 |
| 2017/0131395 A1* | 5/2017 | Reynolds | ................. | G01S 13/56 |
| 2018/0059213 A1* | 3/2018 | Wallstedt | ................. | H04K 3/226 |
| 2018/0095161 A1* | 4/2018 | Kellum | .................... | G01S 13/10 |
| 2018/0199377 A1* | 7/2018 | Sanderovich | ...... | H04W 74/0816 |
| 2018/0348339 A1* | 12/2018 | Lien | .......................... | G01S 7/006 |
| 2018/0348340 A1* | 12/2018 | Lien | .......................... | H04B 1/44 |
| 2018/0373340 A1* | 12/2018 | Cheng | ..................... | G06F 3/017 |
| 2020/0133398 A1* | 4/2020 | Williams | ................. | G06F 3/017 |
| 2020/0319302 A1* | 10/2020 | Nanzer | ................ | G01S 13/4454 |
| 2021/0088643 A1* | 3/2021 | Hayashi | ................... | G01S 13/42 |
| 2021/0181328 A1* | 6/2021 | Hayashi | ................... | G01S 13/04 |

\* cited by examiner

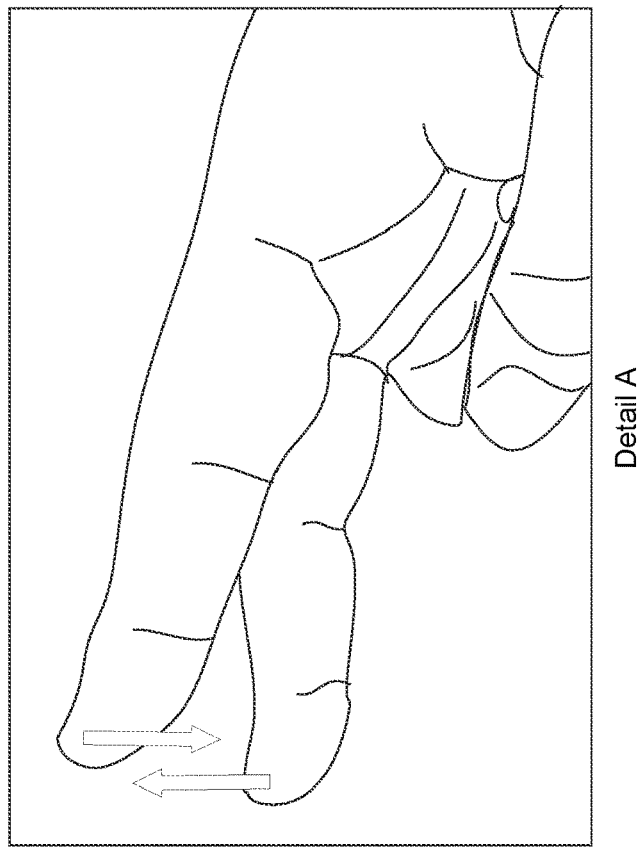
Detail A
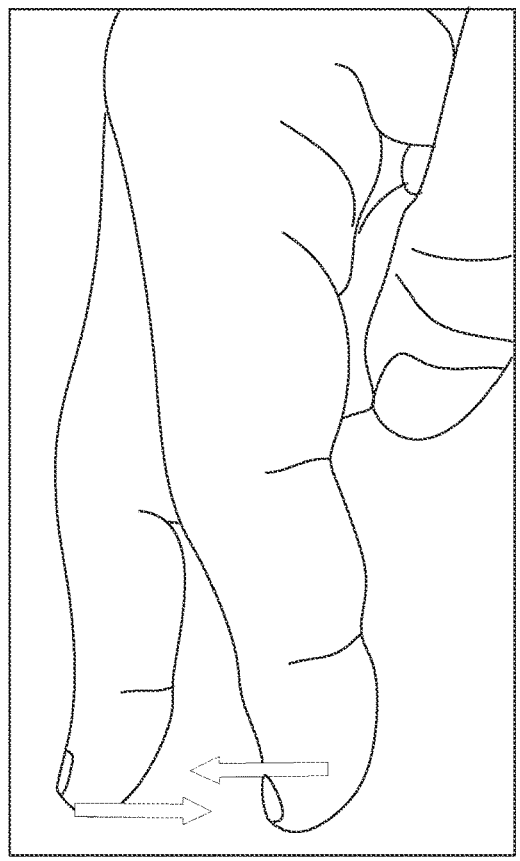
Detail B
FIG. 7

GESTURE DETECTION IN INTERSPERSED RADAR AND NETWORK TRAFFIC SIGNALS

CROSS-REFERENCE TO RELATED APPLICATIONS

This application claims the benefit of U.S. Provisional Application No. 62/880,079, filed Jul. 29, 2019, entitled "Gesture Detection In Interspersed Radar and Network Traffic Signals" which is incorporated herein by reference in its entirety.

TECHNICAL FIELD

This disclosure relates to gesture recognition techniques, and more particularly to using transmit and receive communication antennas of an electronic device to provide a radar capability for gesture classification and control.

DESCRIPTION OF THE RELATED TECHNOLOGY

Electronic devices such as smart phones, tablets, or "Internet of Things" (IoT) devices and appliances can be made more functional by equipping them with sensors configured to support gesture recognition, such that the electronic device may be controlled without necessarily being in physical contact with a user. For example, gesture recognition enables users to perform certain functions by swiping a hand, finger, or stylus proximate to but not necessarily in contact with the electronic device. Potential uses include: turning the device on/off, turning the volume up/down, flipping a page, scrolling a page up/down, for example. Gesture recognition may be particularly useful when the device does not have a touch screen or when touching the screen is inconvenient (e.g. wet hands).

In the absence of the presently disclosed techniques, touch or gesture recognition sensors used in electronic devices are generally capacitive sensing, infra-red (IR) motion detectors, or cameras with video processing. Capacitive sensing and IR detection require dedicated hardware that are relatively bulky; video processing of camera imagery is a very inefficient method in terms of power consumption and computational requirements since it needs continuous monitoring and processing Thus, improved gesture recognition techniques are desirable.

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

FIG. 7 illustrates an example of a two finger gesture that may be recognized using the presently disclosed techniques.

FIG. 15A shows a time-domain plot of the phase of the received radar signal for a continuous (non-decimated) millimeter wave signal reflected off of the user's hand. FIG. 15B shows a time-domain plot of the phase of the received radar signal for a decimated millimeter wave signal reflected off of the user's hand during the same double-tap gesture. FIG. 15C is an example of a spectrogram and shows a frequency-domain plot of the phase of the received radar signal for a continuous (non-decimated) millimeter wave signal reflected off of the user's hand. FIG. 15D is an example of a spectrogram and shows a frequency-domain plot of the phase of the received radar signal for the decimated millimeter wave signal reflected off of the user's hand.

DETAILED DESCRIPTION

Figure 1:
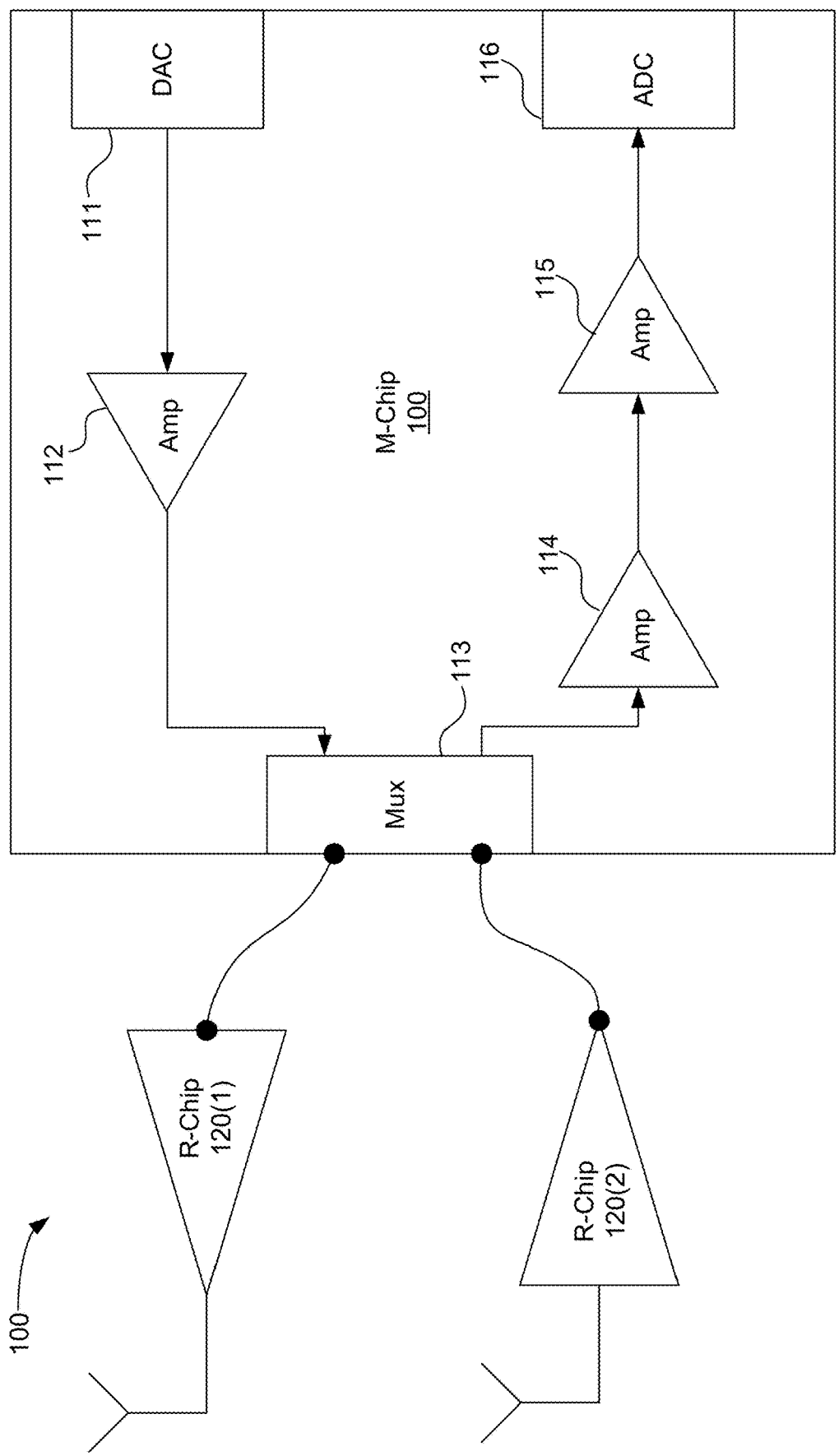
FIG. 1 illustrates an example of a radar arrangement, according to an implementation.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a millimeter band communications capability. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, steering wheels, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automated teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Details of one or more implementations of the subject matter described in this specification are set forth in this disclosure, which includes the description and claims in this document and the accompanying drawings. Other features, aspects and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting.

The systems, methods and devices of the disclosure each have several innovative aspects, no single one of which is solely responsible for the desirable attributes disclosed herein.

Gesture Detection with Millimeter Wave Radar

One innovative aspect of the subject matter described in this disclosure relates to recognizing gestures proximate to an electronic device or appliance using RF components disposed on the device. The RF components include a plurality of mm wave antenna modules, each antenna module including at least one transmit and one receive antenna, wherein said antennas are operable at a frequency of 20 GHz or higher. The RF components may be operable in the 60 GHz band (approximately 57-64 GHz) and may be compatible with the IEEE 802.11ad and/or IEEE 802.11ay Wi-Fi protocols. In accordance with the presently disclosed techniques a radar capability is provided by simultaneously operating a transmitter RF chain and a receiver RF chain.

The IEEE 802.11ad/y Wi-Fi protocols relate to advanced wireless communication networks operating in the unlicensed 60 GHz band. The protocols contemplate a substantial improvement for Wi-Fi communications in terms of both data rates and latencies compared to the Wi-Fi protocols of the unlicensed 2.4 and 5 GHz bands. The 60 GHz band is an unlicensed 57-64 GHz frequency band, also known as mm Wave frequencies.

One of the major challenges in providing reliable wireless communication networks in the 60 GHz band is the relatively heavy attenuation and shadowing observed for channels operating in that spectrum. As a result, communication systems in the 60 GHz band relay on sophisticated beam-forming techniques. That is, systems at 60 GHz uses dedicated signal-processing algorithms with highly directional antenna arrays that provide communications over electronically maneuverable directional-beams between transmitters and receivers of the network.

An 802.11ad/y packet starts with a short training field, followed by a channel estimation field (CEF), packet header, PHY-payload and optional fields for gain control and additional training. The CEF is composed of Golay complementary sequences (in this case, 128 symbols long) used in estimating the channel response characteristics.

The present disclosure contemplate gesture recognition techniques compatible with an 802.11ad/y networking chip set that cab be operated with several RF chains simultaneously. In particular, the chip set may be operated with two RF chains, one for transmission and one as a receiver. These two RF chains may be operated simultaneously to provide radar capabilities. Gesture recognition may be accomplished by analysis of the Golay correlation outputs. Examples of gesture recognition include but are not limited to (a) finger-based gesture recognition for "slider control"; (b) detection of two-finger relative motion; and (c) 2-D gesture (e.g., vertical or circle motion) in space.

FIG. 1 illustrates an example of a radar arrangement, according to an implementation. The arrangement 100 may be based on a communication system compatible with the IEEE 802.11ad and/or IEEE 802.11ay Wi-Fi protocols. In the illustrated implementation, the arrangement 100 includes a base-band chip 110 (denoted as M-chip) and two radio frequency (RF) chips, denoted as R-chip 120(1) and R-chip 120(2). In the illustrated example, the M-chip 110 includes a multiplexer (Mux) 113, and a digital-to-analog converter (DAC) 111, and amplifier 112 coupled with the Mux 113. The M-chip 110 also includes an amplifier 114, coupled with Mux 113, amplifier 115 and analog-to-digital converter (ADC) 116. The mux 113 is coupled with the R-chip 120(1) and the R-chip 120(2). In some implementations, the M-chip 110 may operate all the signal and management processing required for communication and radar processing, including for example, generating and processing transmitted and received signals. In addition, the M-chip may control channel-access protocols and additional beam-configurations operations. The two RF chips, R-chip 120(1) and R-chip 120(2), may be similar or identical, one (R-chip 120(1)) being configured as a transmitter and the other (R-chip 120(2)) as a receiver. In some implementations, each chip may include and control up to 32 or more antenna elements and may include respective functional elements (not illustrated) such as power amplifiers (PA), low noise amplifiers (LNA), phase shifters as well as control units for beamforming operations. In some implementations, it is contemplated that an array of approximately 32 small (2.5 mm width) antenna elements may be disposed on a single R-chip. Such a configuration, advantageously, can generate a narrow beam for both transmission and reception, and thereby mitigate relatively high free space path loss anticipated for operation in the 60 GHz band.

Advantageously, both the M-chip 110 and the R-chips 120(1) and 120(2) may be fully compliant with an applicable 802.11 standard. In a communication mode, a single RF chip may operate, in a time-division duplex (TDD) fashion, as both a receiver and transmitter. However, the present techniques contemplate obtaining radar functionality by performing receiving and transmitting simultaneously, an operating mode that may be enabled by adding functionality to the M-chip.

Figure 2:
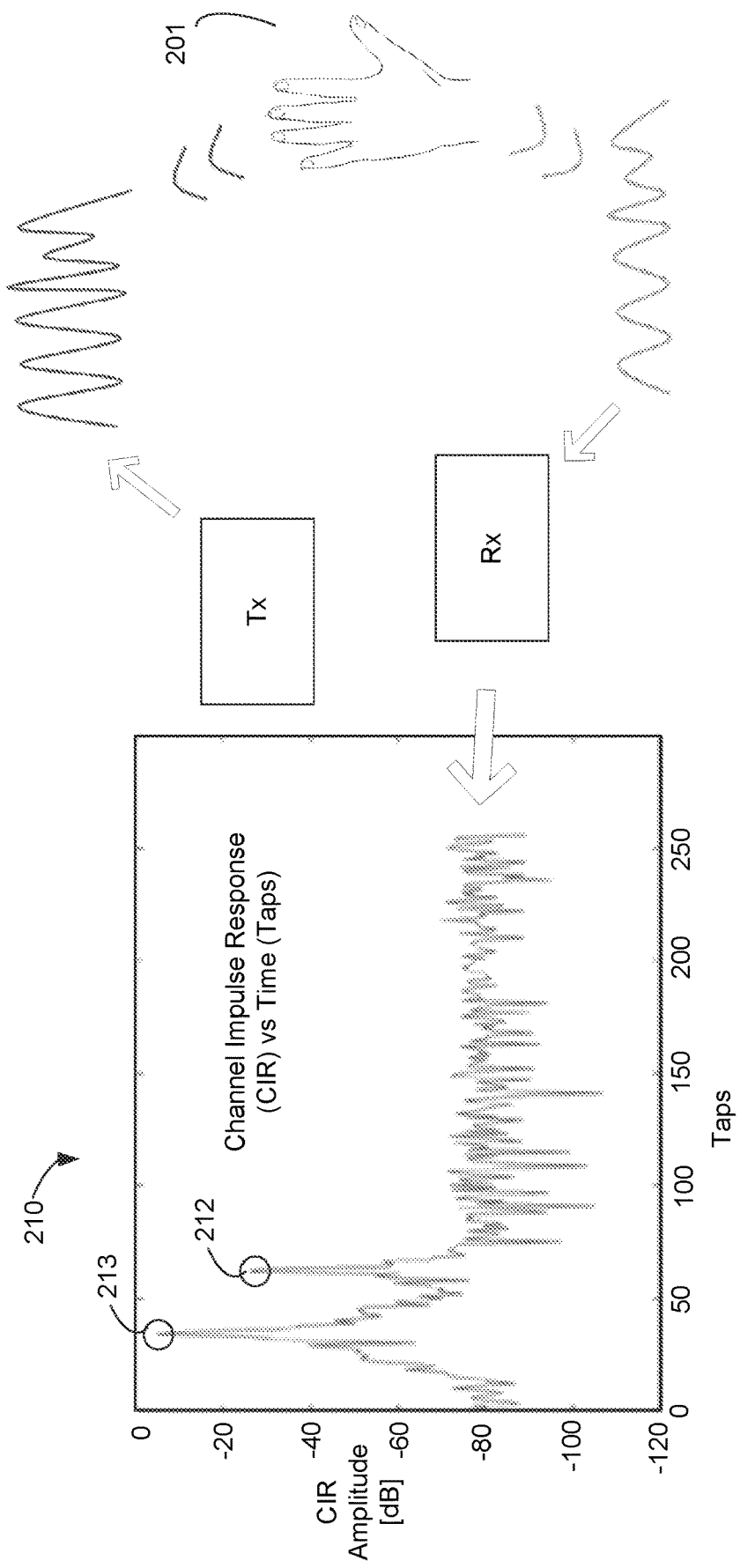
FIG. 2 illustrates an example of a radar system operation in accordance with an implementation.

FIG. 2 illustrates an example of a radar system operation in accordance with an implementation. An electromagnetic wave is transmitted from a transmit (Tx) module (e.g., R-chip 120(1)) and reflected back from a target object 201. Some of the reflected electromagnetic wave is received by a receive (Rx) module (e.g., R-chip 120(2)). The received signal may be sampled for purposes of detecting the presence of the target object 201. By estimating the time-of-flight and the angle-of-arrival, the location and speed of the target object 201 may be estimated. As noted above, in some implementations the radar system may include thirty two antenna elements at each of the transmitter module and at the receiver module. As a result, the radar system may be configured to detect multiple objects and also more accurately estimate the direction of arrival. By controlling the direction of transmission, the radar system may be provided with even further improved spatial separation resolution.

Performance of a radar system may be expressed by the following equation:

$$P_r = \frac{P_t G_t G_r \sigma c^2}{(4\pi)^3 f^2 R^r}$$

where $P_r$ is the transmit power, $G_t$ and $G_r$ are the gains of the transmitter and receiver, respectively, c is the speed of light, f is the transmitted signal carrier frequency, R is the range to the target, σ is the radar cross-section (RCS) and r represents the reflection type. The RCS (σ) is a unit-less factor which may depend on the specific target type of interest. For example, metallic objects have higher RCS than human tissue. The reflection type r is usually set with values in the range 2-4. For examples, Snell-based reflection is usually set with r=2 where scattering-based reflections are set with r=4. This parameter is intended to describe the situation where sometimes most of the energy can be reflected back in the direction of the transmission.

Digital signal processing (DSP) of signals transmitted and received may be performed. In some implementations DSP may be performed by logic within or associated with M-Chip 110, for example. In some implementations, advantageously, Golay sequences used for various objectives in an IEEE 802.11ad and/or IEEE 802.11ay modem may be adapted for the presently disclosed radar applications. Thus, communication digital hardware already contemplated for communications protocols in accordance with IEEE 802.11ad and/or IEEE 802.11ay may be dually purposed. The DSP may also include decimation and interpolation filters for mitigation of out-of-band noise or interference using either or both of the high bandwidth of 3.52 GHz channel bonding (CB2) or lower bandwidth of 1.76 GHz channel bonding (CB1). Finally, DSP may provide accurate timing of the signals reflected from a target (plot 210) and distinguish the received reflected signals (peak 212) from received transmitter leakage (i.e., mutual coupling) signals (peak 213). DSP may further be used to correctly mitigate and synchronize interference.

Plot 210 depicts an example plot of channel impulse response (CIR) in dB as a function of time. For convenience, time is represented in terms of "taps" where taps are time domain samples of a single packet-correlation of a channel estimation. Advantageously, channel estimation is executed using complementary Golay sequences as defined by the above mentioned 802.11 standards. More particularly, the disclosed techniques may provide radar capabilities using a networking chip set that is fully compatible with the above mentioned 802.11 standards by simultaneously operating transmitter and receiver RF-chains. Where radar operation is adapted for gesture recognition, face detection, etc., the time samples of a single Golay correlation may adopt a notion of distance, instead of a notion of time. This is because the time in a perspective of a single correlation corresponds to the wave traveling-time from the radar system to the target and back. For channel bonding (CB) 1, each tap corresponds to about 8 cm and for CB2 to about 4 cm.

Figure 3:
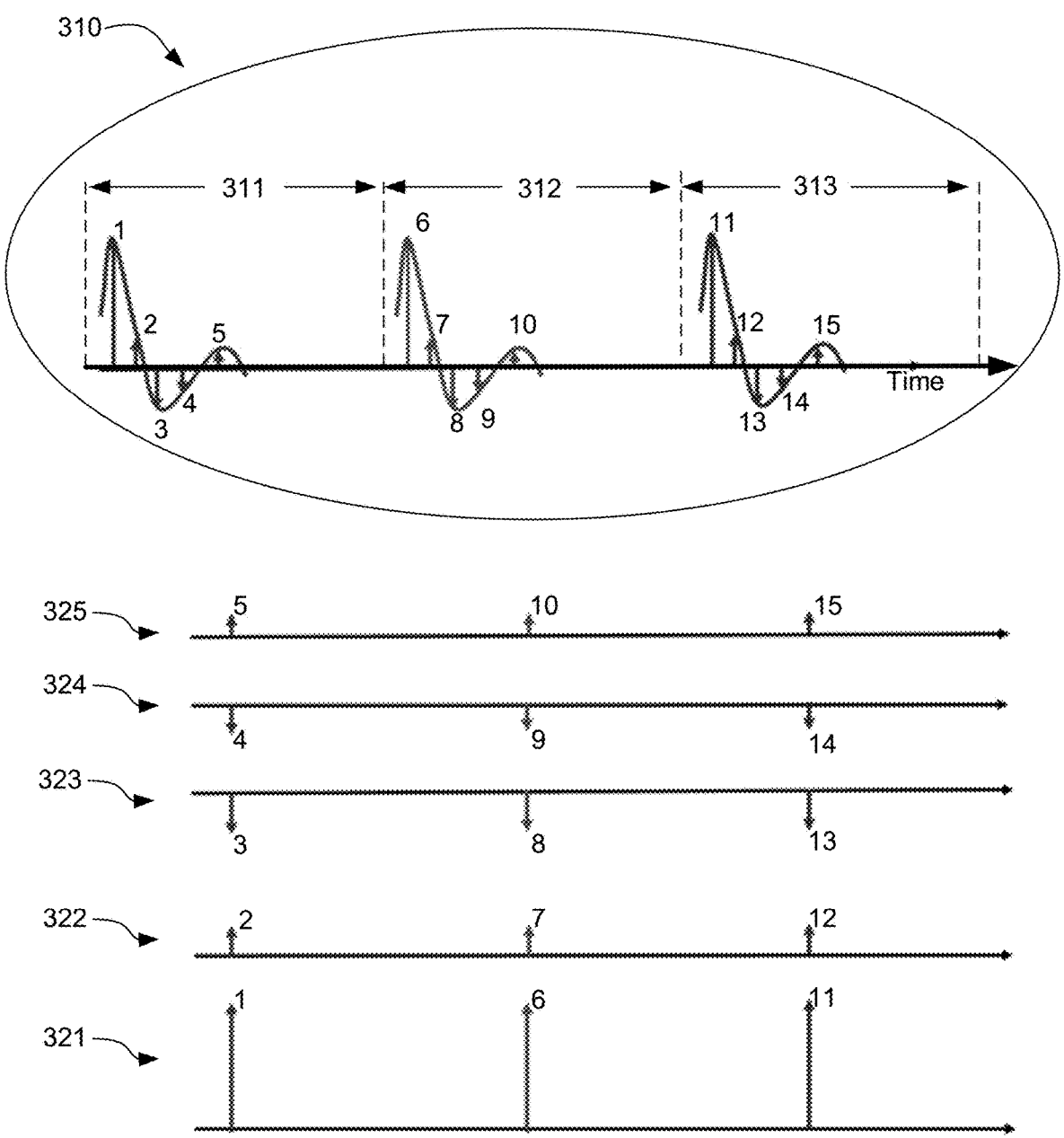
FIG. 3 illustrates time and "tap" domains for radar operation of a chip set compatible with IEEE 802.11ad and/or IEEE 802.11ay.

FIG. 3 illustrates time and "tap" domains for radar operation of a chip set compatible with IEEE 802.11ad and/or IEEE 802.11ay. The plot 310 illustrates correlation outputs vs time for three consecutive packets, occurring, respectively, during time intervals 311, 312 and 313. For clarity of illustration, each Golay correlation output is depicted as contributing to 5 samples, denoted by vertical arrows, numbered 1-15. In a tap notation, these signals are denoted Tap 1-Tap 5; the time signal for Tap 1, plot 321, is made from samples 1, 6 and 11 of the Golay correlation output; the time signal for Tap 2, plot 322 is made from samples 2, 7 and 12; the time signal for Tap 3, plot 323, is made from samples 3, 8 and 13; the time signal for Tap 4, plot 324 is made from samples 4, 9 and 14; and the time signal for Tap 5, plot 325, is made from samples 5, 10 and 15. Thus, from an algorithmic perspective, correlation outputs vs time, plot 310, may be regarded as five time-signals, each corresponding to a different distance from the radar system. Alternatively or in addition, an observation signal and a vector signal may be modeled such that, in each time, a vector of observations is provided for each tap. That is, in a time t, the observed samples make up the vector $X_t = (X_t^{(1)}, X_t^{(2)}, \ldots, X_t^{(N_T)})$, where $N_T$ is the number of taps, i.e., the number of samples provided for a single Golay correlation. Referring still to FIG. 3, where the time sampling interval is the time interval between transmitted packets, the sample vector $X_1$ is made from samples 1, 2, 3, 4 and 5, the sample vector $X_2$ is made from samples 6, 7, 8, 9, and 10 and the third sample vector $X_3$ is made from the samples 11, 12, 13, 14 and 15.

As indicated above, the present techniques contemplate the use of complementary Golay sequences for target detection. In contrast to conventional frequency modulation continuous wave (FMCW) techniques, also known as chirp or Linear Frequency Modulated (LFM), a Golay radar scheme provides near-zero side lobes (advantageous, particularly, for multi-target detection). Traditionally, sonar and radar designers avoided using compressed pulses schemes, such as those presently disclosed, because the performance of such schemes is poor in scenarios where a target maneuvers with a relatively high speed. But the present inventors have appreciated that use of the Golay radar scheme may be advantageous, at least for the intended use of gesture recognition where the target range and speed are each relatively small.

Figure 4:
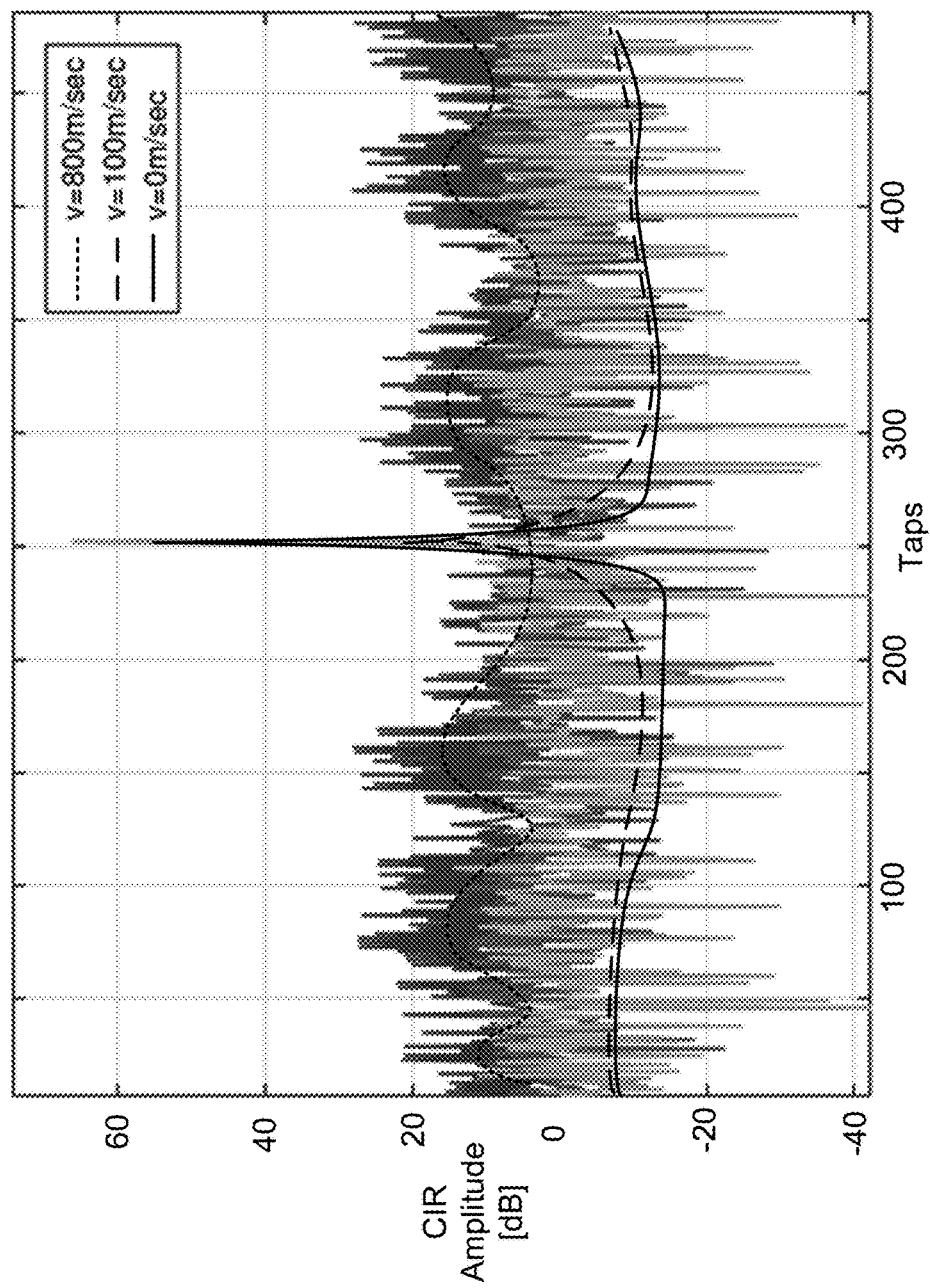
FIG. 4 illustrates an example plot of Channel Impulse Response (CIR) for a Golay scheme radar using the 802.11ay channel estimation field (CEF) as the transmitted waveform.

FIG. 4 illustrates an example plot of Channel Impulse Response (CIR) for a Golay scheme radar using the 802.11ay channel estimation field (CEF) as the transmitted waveform. For a stationary target (v=0 m/sec) the CIR has zero side-lobes around the tap of the target. However, even for relatively high-speed target of 100 m/sec (360 Km/H) the CIR is hardly affected and still maintains multi-target detection capability. Only for speeds of about 800 m/sec and above, not to be taken into consideration for human gesture recognition, does a noticeable side-lobe increase appear. Thus, for practical gesture recognition using millimeter-wave radar, a scheme based on the 802.11ay CEF Golay sequence is expected to outperform a radar scheme based on Frequency Modulation Continuous Wave (FMCW) signal waveforms.

Figure 5:
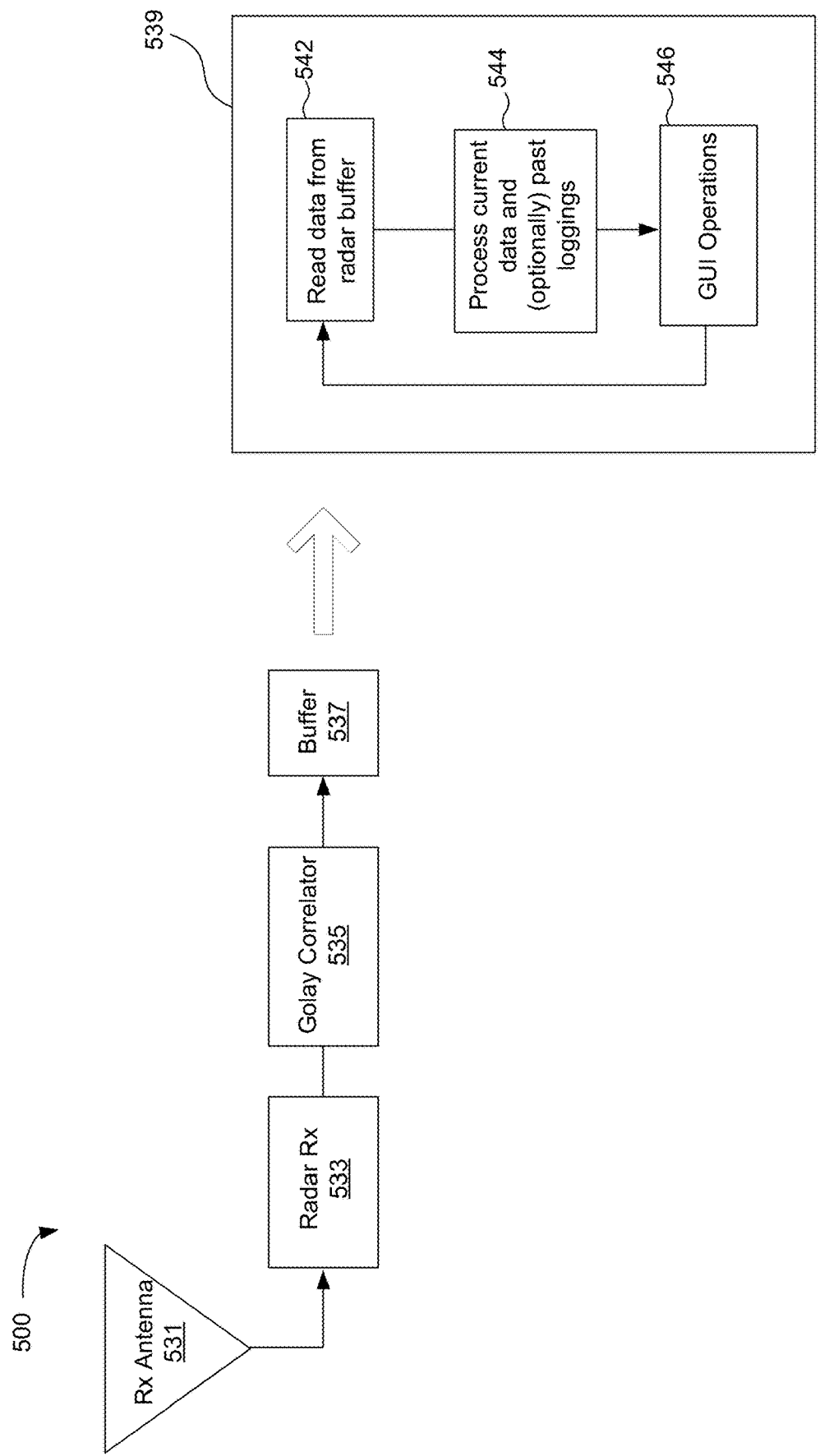
FIG. 5 illustrates an example radar hardware setup and an iterative-processing flow-chart that may be executed by an associated host electronic device, according to some implementations.

FIG. 5 illustrates an example radar hardware setup and an iterative-processing flow-chart that may be executed by an associated host electronic device, according to some implementations. The radar hardware setup may be implemented in a host electronic device that includes a processor. The electronic device may include a wireless communications capability using beamforming techniques and including a plurality of millimeter wave antenna modules, each antenna module including at least one transmit antenna and at least one receive antenna, wherein said antennas are operable in one or more frequency ranges greater than 20 GHz. The processor may be configured to perform gesture recognition with the electronic device by simultaneously operating the at least one transmit antenna and the at least one receive antenna so as to provide a radar capability and detecting a presence and motion of a reflective object by analyzing magnitude and phase of signals received by the at least one receive antenna and resulting from reflection of signals transmitted by the transmit antenna and reflected by the reflective object.

In the illustrated example, a gesture recognition system arrangement 500 includes an Rx antenna 531, coupled with a radar receiver 533. A Golay correlator 535, samples of outputs of which are stored in a buffer 537. A host processor 539 may be configured to execute process flow steps related to gesture recognition and control of an electronic device responsive to recognize gestures. In the illustrated example, the host processor 539 may be configured to read, at block 542, data from the radar buffer 537. A recognized gesture may be obtained and output by processing, at block 544, currently read data from the buffer 537 (and, optionally, previously read data). Finally, the processor may be configured to execute a graphical user interface (GUI) operation, at block 546, responsive to the recognized gesture.

The arrangement 500 may be adapted to recognize any number of specific types of gestures. For better understanding of the disclosed techniques, three specific examples of gesture types are described below: (a) finger-based gesture recognition for "slider control"; (b) detection of two-finger relative motion; and (c) 2-D gesture (e.g., vertical or circle motion) in space.

Considering first finger-based gesture recognition appropriate for control of a virtual "slider" (e.g., a volume control), the gesture recognition may be based on observations taken from the output of a receiver compliant with the above-mentioned 802.11 standards. Advantageously, outputs from the receiver's Golay correlation (that may be ordinarily available for channel estimation) are sampled. For finger-based gesture recognition, correlation output samples are taken that correspond to distances in the range 0-40 cm from the Rx antenna. Such a range corresponds to the first 5 correlation taps for channel bonding CB1 and 8-10 correlation taps for CB2 (where each tap corresponds to half the distance of a CB1 tap). Finger movements for slider control (relatively slow, fine motions) have been found to be highly observable in the phase domain of the received signal. At 60 GHz (5 mm wavelength), for example, a 1 mm target displacement represents approximately 144° of phase shift because such displacement changes the traveled wave round trip distance by 2 mm (40% of the wavelength). Accordingly, in some implementations, samples of the phase of the measured Golay correlation outputs are collected where each sampled Golay correlation is a complex number indicative of travel distance of the transmitted waveform distance.

In an example implementation, the 802.11ad channel estimation packets may be set to operate at a rate of 2 msec apart, thereby providing samples of the phase of the Golay correlation output at a rate of 500 Hz. To increase signal to noise ratio (SNR), in some implementations, 16 consecutive Golay pulses (a few micro-seconds apart) may be provided at each 2 msec interval. These samples may be coherently summed up in order to provide a substantial SNR increase per reading without significantly increasing the power consumption. More particularly, in the example implementation, the following sum may be calculated at each 2 msec interval:

$$X = \sum_{t=1}^{N_p} A_t e^{j\phi_t}$$

where $N_p$ is the number of consecutive, micro-seconds-apart, channel estimation packets (i.e., 16 in this example), and $A_t e^{j\omega_t}$ is the Golay correlation output of the channel estimation packet t out of the $N_p$ number of packets. Because human gesture movements are relatively slow, such motion is not observable across the $N_p$ pulses, and the summing procedure described above consistently achieved good coherent gain.

In every processing iteration (FIG. 5, block 544), a processing of a batch of $N_B$ samples $$X_{t_1}, \ldots, X_{t_{N_B}}$$

may take place, some of these are newly read samples and some are samples from previous iterations, where $X_t$ corresponds to samples summed, as described above, at 2 msec intervals. Because signal amplitude changes very slowly and is sensitive to temperature changes, the present techniques may rely mainly on information carried by the phase, more particularly the $N_B$ phase samples $$\angle X_{t_1}, \ldots, \angle X_{t_{N_B}}.$$

Such phase samples may also exhibit significant noise, both as a result of motion of the target that is unrelated to an actual gesture to be recognized and as a result of thermal noise. Such phase noise may be treated as corresponding to a multiplicative factor of the received signal, similar to a fading in communication models. More particularly, in the present example, the correlation output, for a given tap, may be modeled as $X=\alpha A \cdot e^{j\phi}+n$, where $A>0$ is a real number, and corresponds to observation magnitudes (proportional to a target reflection factor), $\phi$ is the phase of the correlation output, n is the thermal noise and a is a complex-valued multiplicative noise factor.

Figure 6:
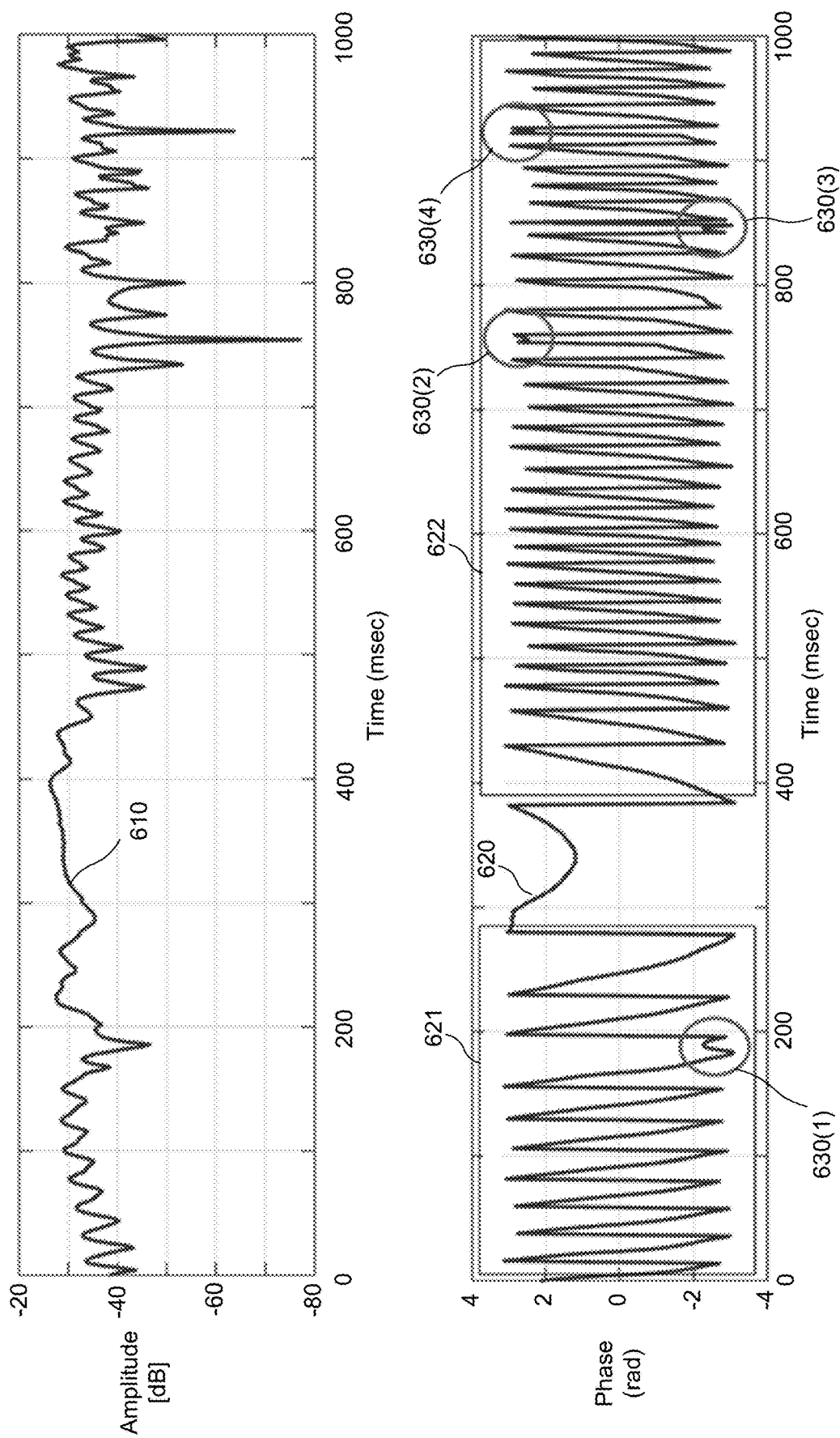
FIG. 6 illustrates an example of a recording of magnitude and phase of a single correlation-tap of a single antenna for a target moving outward and inward with respect to the radar arrangement.

FIG. 6 illustrates an example of a recording of magnitude and phase of a single correlation-tap of a single antenna for a target moving outward and inward with respect to the radar arrangement. More particularly, the magnitude (plot 610) and phase (plot 620 of the single antenna single correlation-tap are illustrated in FIG. 6. During time period 621 the target is moving outwards from the radar arrangement; during time period 622 the target is moving inwards toward the radar arrangement. In general, a steady slope (either decrease or increase) of the phase may be observed in each interval that results from the Doppler effect of the target's movement.

In the example plot, events 630(1), 630(2), 630(3) and 630(4) are circled and indicate occurrences of abnormal phase behavior that may correspond to a multiplicative noise factor that may be related to target instability.

In some implementations, effects of phase noise may be mitigated by one or both of: (1) applying a piece-wise linear fit, and (2) applying a median filtering for the evaluated linear-slopes of the piece-wise linear fitting results. The motivation for piece-wise linear fit follows from the rather steady increase and decrease behavior of the phase that is observed in substantial hand motions as well as extremely subtle finger movements. The median filtering may be advantageous for denoising the abnormal multiplicative noise-factor events. Even an extremely short median window has been found to provide a very steady and clean phase for gesture control.

In some implementations, a number $N_a$ of phase samples may be chosen for an evaluation of a single linear fit in the observed sequence. In an example implementation, setting $N_a=8$ samples per slope was found to provide a good use experience. During tests with real modules compliant with 802.11ad, the inventors have found that 5-20 samples at a sample rate of 500-1000 samples per second are sufficient to detect even very delicate slider movement gestures and provide a good user experience.

In an example implementation, for a particular iteration that includes $N_n$ new samples, $$X_{t_1}, \ldots, X_{t_{N_n}}$$

a batch or $N_B$ samples may be chosen for processing, where $$N_B = N_a \cdot \left\lceil \frac{N_n}{N_a} \right\rceil,$$

and includes a quantity of past (previously logged) samples, $N_B-N_n$. A piece-wise least square (LS) linear fit may be carried for every $N_a$ samples, out of the $$\left\lceil \frac{N_n}{N_a} \right\rceil$$

groups filled in the current batch of $N_B$ samples. For the $N_a$ samples $$\angle X_{t_1}, \ldots, \angle X_{t_{N_a}}.$$

the LS linear fit is given by $X_t^l=a \cdot t+b$ where the slope a and constant b are given by the following equations:

$$a = \frac{\sum_{i=1}^{N_a}(t_i-\bar{t})(\angle X_{t_i}-\overline{\angle X})}{\sum_{i=1}^{N_a}(t_i-\bar{t})^2}; \text{ and } b = \overline{\angle X} - a \cdot \bar{t},$$

where $\bar{t}$ and $\overline{\angle X}$ are, respectively, the mean time and the mean phase for a given sample:

$$\bar{t} = \frac{1}{N_a}\sum_{i=1}^{N_a} t_i; \overline{\angle X} = \frac{1}{N_a}\sum_{i=1}^{N_a} \angle X$$

Advantageously, the linear fit may be simplified taking into account that only the slope may be of interest, not the exact location of the linear fit. As a result, the computations of the constant b may be eliminated. In addition, the slopes may be evaluated with respect to arbitrary time units, $t_1=1$; $t_2=2$; ... $T_{N_a}=N_a$. In some implementations, therefore, a sequence of slopes $\{a_k\}$ are filtered by a moving median filter of length $N_m$ to provide a sequence of filtered slopes $\{s_k\}$ where the k-th filtered sample $s_k$ is given by the following equation:

$$s_k \text{ median}(a_{k-(N_m)+1}, a_{k-(N_m)+2}, \ldots a_k).$$

The present inventors have found selecting $N_m=5$ to provide a good user experience.

For the presently described finger-based gesture recognition appropriate for control of a virtual "slider", an example control technique may be described as follows:

$$L_t = \begin{cases} -L & : t-1+\alpha s_t \leq -L \\ L & : L \leq L_{t-1}+\alpha s_t \\ L_{t-1}+\alpha s_t & : \text{otherwise} \end{cases}; \quad \text{Eq (1)}$$

where $L_t$ is the slider-control level at time t, $\alpha$ is an attenuation factor, $s_t$ is the current linear fit slope and $[-L, L]$ is the range of operation. The attenuation parameter $\alpha$ may be set optimize the user experience for at least a majority of users. Testing has shown a variation in user preference, with some users preferring lower a while others found a higher a more satisfactory. In some implementations, an attenuation of about 0.2 was found to provide an appealing user-experience for most users. The main tradeoff with respect to user experience is between target instability and responsivity. The gain must be set high enough to support a speed of tracking so that the system feels responsive enough on the one hand while on the other hand provides solid appearance for the slider-level so it will not shake (target instability is controlled by lowering the value of α.

In some implementations, a further mechanism for enhancing the user experience may be introduced, in which a quantized version of the slider control level is presented. In the quantized version of the slider control, a quantized slider-level $L^Q \in \{0, 1, \ldots, Q\}$ is computed in the following manner. Each time a range L or −L is reached by $L_t$, the quantized level $L^Q$ is incremented or decremented and $L_t$ is set to zero. The value L may be chosen so that (a) all target instability behaviors is maintained within a range [−L, L] too small to be observable by the user and (b) the quantized slider control tracks the target movements closely (i.e., the boundaries L and −L are reached fast enough), even in response to gentle user movements, so that the quantized slider-level move in a responsive manner.

It should be noted that the phase samples in a given iteration $$X_{t_1}, \ldots X_{t_{N_B}}$$

may be provided by the Golay correlators for all the taps that are observed in a current setting. As indicated above, for the case of CB2, 8-10 taps are of interest. The taps for which processing should take place are the ones corresponding to the actual location of the finger or hand position, but this location will not generally be known and may vary during operation. Thus, a methodology to decide which of the tap samples to use in every iteration is desirable. In some implementations, the methodology includes one or more of the following techniques: (1) taking the angle corresponding to maximal strength tap; (2) showing an average tracker; (3) updating the tracker based on maximal move slope The first technique may include inspecting the Golay-correlation magnitudes $$|X_{t_1}|, \ldots |X_{t_{N_B}}|.$$

Each of these samples may be available for all $N_T$ taps (i.e., $X_t^{(1)}, \ldots, X_t^{(N_T)}$). The first technique may find the tap index $i^*$ that maximizes the magnitude $i^* = \mathrm{argmax}_{1 \leq i \leq N_T}(|X_t^{(i)}|)$ and evaluate the slopes based on the phase samples corresponding to magnitude-maximizing taps, using, for the t-th sample, $\angle X_t^{i^*}$.

Taking the strongest tap as described above is not necessarily optimal in every gesture application. In particular, in an instance of gentle figure movements, it may be the case where the strongest tap is not reflected from the finger but from the palm of the hand, for example (or other large and firmly positioned reflective target). The second technique serves to mitigate this problem by showing the user an average slider position based on all taps of interest. A variation of this technique may be to use a quantized slider position where the tracking $L_t$ to initiate the quantization shift is the average on all trackers (with respect to taps). The motivation for this variation is that the tracker that relates to the actual gesture will be the dominant part and therefore the average will reflect the correct tap to follow. Other trackers will either be still, or resembles a noisy random-walk behavior which on average sums up to zero movement.

The third technique may use the tracker that corresponds to the maximal movement. The second and third techniques, for a set of tracking values $L_t^{(i)}$, $1 \leq i \leq N_T$ for every tap of interest, may be compared as follows. The second technique may use the average slider control level $$\overline{L_T} = \frac{1}{N_T} \sum_{i=1}^{N_T} L_t^{(i)}$$

whereas the third technique may update the slider control level found by Eq (1) based on the phase $s_t^{(i^*)}$, where $$i^* = \mathrm{argmax}_{1 \leq i \leq N_T}(|s_t^{(i)}|)$$

In some implementations, the second technique contemplates carrying out averaging on the basis of slope, i.e., computing a single tracker with an average slope by, for example, substituting in Eq (1), for $s_t$ an average slope $\overline{s_t}$ (where averaging takes place over the taps).

In the presently described use case of finger-based gesture recognition for slider control, an important aspect includes the detection of a presence of a finger, its entrance into and exit from a region in which slider control is to be actuated (i.e., starting the gesture and finishing the gesture). Advantageously, enabling of slider-control should be introduced so that the slider-control is enabled only when a user intention for moving the slider is detected. Instances in which the user does not want the slider to move are mainly during the insertion of the finger to the position of slider-control and the removal. In some implementations, distinguishing instances in which slider control is desired from those in which slider control is not desired may be provided by testing that the slopes do not pass a certain threshold. That is, the technique may enable the tracker update in Eq (1) only when $|s_t^{(i)}| < s_{TH}$ $\forall$ $1 \leq i \leq N_T$, where $S_{TH}$ is a predefined threshold to enable the slider. It will be appreciated that some trade-off exists in setting an appropriate value for $S_{TH}$. For example if $S_{TH}$ is set at too high a value, the slider may be enabled in undesirable occasions. Contrariwise, if $S_{TH}$ is set at too low a value, there may be occurrences when a user gesture intended to trigger slider movement is not recognized.

In some implementations, detection of a target is advantageously maintained using observations of magnitude. More particularly, if $$\max_{1 \leq i \leq N_T}(|X_t^{(i)}|) > M_{Th},$$

then presence of a target is recognized and the tracking of Eq (1) may be implemented. Otherwise, the tracking of Eq (1) may be disabled.

A further detection rule, that may be advantageously employed, relates to variation of magnitudes instead of magnitude per se. For example, such a rule may determine whether $$\max_{1 \leq i \leq N_T} std\left(|X_{t_1}^{(i)}|, |X_{t_2}^{(i)}|, \ldots, |X_{t_{N_S}}^{(i)}|\right) > M_{Th}^S,$$

where std is the standard deviation estimation based on $N_s$ recent samples and $M_{Th}^S$ is a predefined threshold. The present inventors have found that the foregoing detection rule is highly efficient for human hands and fingers due to the natural vibrations of living target objects.

Techniques for recognition of a second specific type of gesture, specifically detection of two-finger relative motion, will now be described. The example gesture relates to detection of switch or increment like commands provided using parallel moment of the index and middle fingers. FIG. 7 illustrates an example of a two finger gesture that may be recognized using the presently disclosed techniques. The two extreme states of this movement with the arrows indicating the direction of movement following the current state. For example, in Detail A, the index finger is in the upper position and the arrow indicates its following move is downwards while the middle finger is at the lower position and the arrow indicates its following movement is upwards; in detail B, the index finger is in the lower position and the arrow indicates its following move is upwards while the middle finger is at the upper position and the arrow indicates its following movement is downwards.

The example gesture may be considered as a rather "gentle" gesture since overall entire movement of both fingers is about 2-3 cm in total and may be performed at a rather moderate speed. It is an easy to perform gesture that comes without any effort from the user perspective. A detection of this gesture can be applied to on-off switch or to a switch position, say a counter of a certain state. In some implementations the gesture detection may be executed simultaneous to the slider control functions described above so as to provide an overall operation of a virtual sound player device. For example, the two finger movement may be used to switch the sound track currently played and the single finger movement may be used for volume control.

Figure 8:
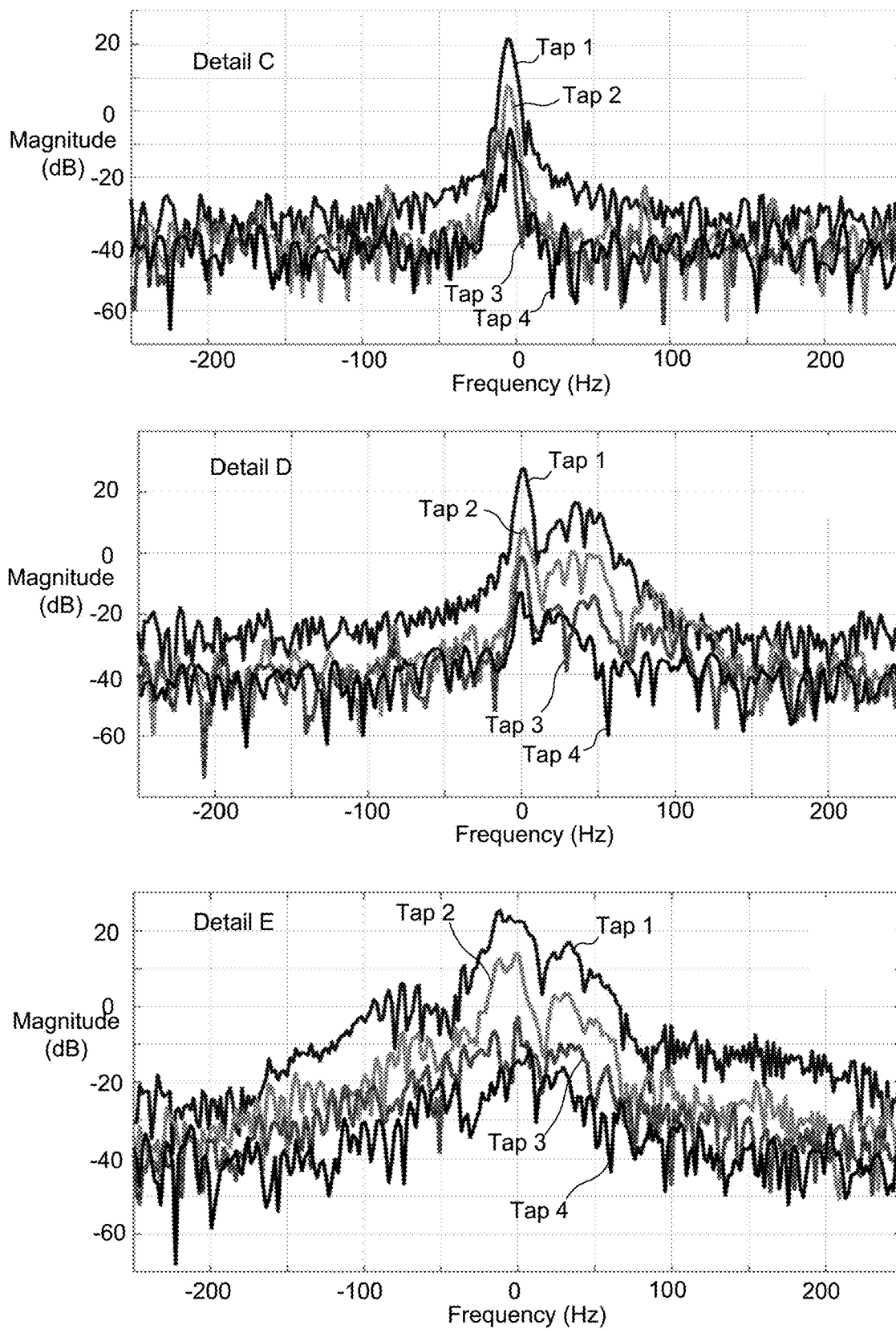
FIG. 8 illustrates examples for the spectrum of the Golay correlation, according to an implementation.

In some implementations, the detection of the two finger movement is based on spectral analysis. Spectral analysis may be carried for a certain tap of interest sampled at the output of the Golay correlation. Each finger movement introduces a complex exponent with frequency offset $\Delta f$ corresponding to its speed. When two fingers are moving simultaneously, the spectral analysis prominent may be expected to exhibit energy both in positive and negative frequencies. Where $S_f$ denote the spectrum of a sample at frequency f, the following detection rule may be applied:

$$\sum_{f \in \mathbb{F}^+} 1_{|S_f| \geq S^{th}} \geq N_+^{th} \text{ AND } \sum_{f \in \mathbb{F}^-} 1_{|S_f| \geq S^{th}} \geq N_-^{th}; \qquad \text{Eq (2)}$$

where $\mathbb{F}^+$ and $\mathbb{F}^-$ are the sets of positive and negative frequency bins for spectral analysis, $|S_f|$ is the spectral density at frequency bin f, $S^{th}$ is a threshold for prominent energy content at a given spectral bin, and $N_+^{th}$ and $N_-^{th}$ are thresholds for the minimal number of frequency bins, in positive and negative frequencies, that are required to be strong enough so that two finger movement is detected. FIG. 8 illustrates examples for the spectrum of the Golay correlation, according to an implementation. Detail C relates to a single unmoving target (finger); Detail D relates to a single moving target (finger); and Detail E relates to two moving targets (fingers).

In some implementations, the sets $\mathbb{F}^+$ and $\mathbb{F}^-$ may be chosen so that detection is based on frequencies above a certain threshold. For example, $\mathbb{F}^+$ and $\mathbb{F}^-$ may be chosen such that $\mathbb{F}^+=\{f > f^{th}: f \in \mathbb{F}^S\}$ and $\mathbb{F}^+=\{f < f^{th}: f \in \mathbb{F}^S\}$, where $\mathbb{F}^S$ is the set of all frequency bins available for spectral analysis (as defined by the time length of the analyzed interval at the sampling rate) and $f^{th} > 0$ is a positive threshold. The above-mentioned choice of $\mathbb{F}^+$ and $\mathbb{F}^-$ may be advantageous in view of the fact that a strong prominent energy around DC (0 frequency) is generally exhibited due to the presence of a strong target (e.g., the palm of the user's hand).

In some implementations, reliability of the two finger movement detector may be increased by discarding spectral analysis when highly fast and strong in or out movement is detected based on an instantaneous phase of the signal. For example, where the current spectral analysis is based on $N_B$ samples, $X_{t_1}, X_{t_2}, \ldots,$ $$X_{t_{N_B}},$$

the spectral analysis may be discarded when $\angle X_{t_i} > \alpha_{th}$, where $1 \leq i \leq N_B$, and $\alpha_{th}$ is a predefined threshold.

Alternatively or in addition, similar protection can be provided by inspecting the phase slopes or filtered slopes and, discarding the spectral analysis when some slope evaluated during a spectral interval of interest exceeds a predetermined threshold.

Moreover, in some implementations, a further performance improvement may be gained when spectral analysis is discarded for a few iterations after an initial discard event takes place as a result of the above described methodology.

Yet another discarding rule may be based on the spectral analysis itself. For example, some strong movements unrelated to a two finger gesture have a strong spectral energy in either positive or negative bands and may be discarded by modifying the analysis of Eq (2). The modifications may include replacing the logical AND with a logical OR, setting substantially higher threshold frequencies for $\mathbb{F}^+$ and $\mathbb{F}^-$, and setting bin counts $N_+^{th}$ and $N_-^{th}$ to substantially higher levels.

In some implementations, a further increase in detection reliability may be obtained by looking for consecutive repetition of detection. For example, spectral analysis may be conducted in moving windows of time. When a consecutive quantity of consecutive detection rules agree in positive detection for two finger movement, then the detection may be set positive.

Figure 9:
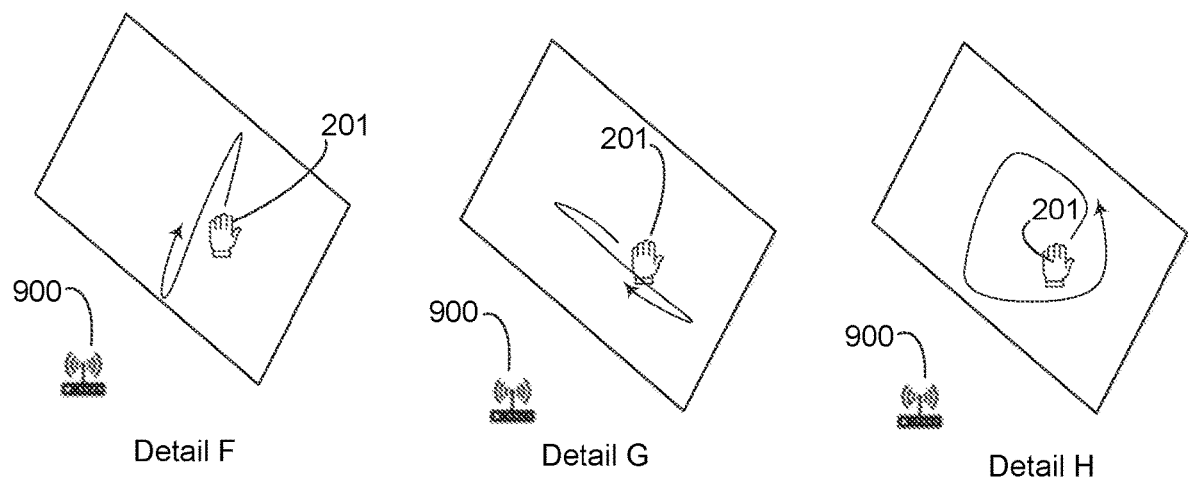
FIG. 9 illustrates three types of motion that may be detected in some implementations.
Figure 10:
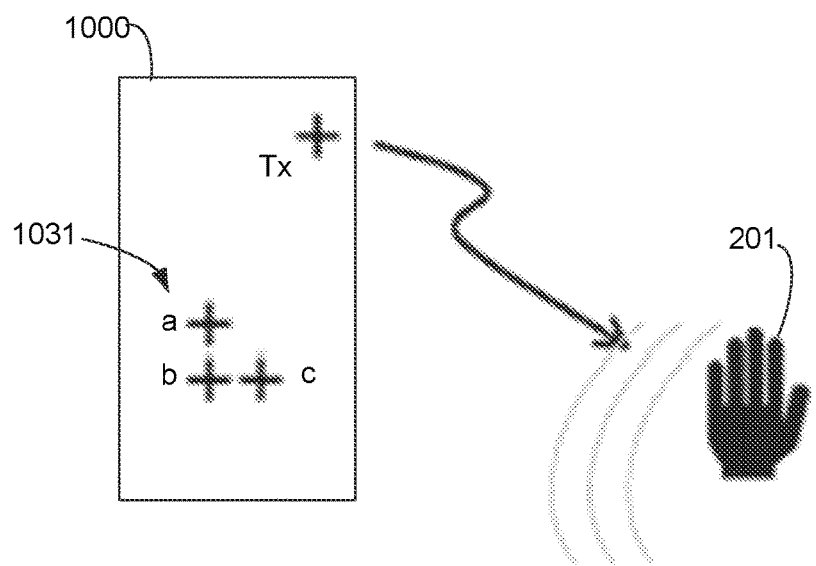
FIG. 10 illustrates an example of a radar arrangement for gesture recognition in a 2D plane, according to an implementation.

Techniques for recognition of a third specific type of gesture, specifically the recognition of gestures in a 2D plane based on movement of a target object in a region within range of the radar arrangement, will now be described. FIG. 9 illustrates three types of motion that will be considered in some implementations. In particular, Detail F and G illustrate, respectively, linear motion of target object 201 in the horizontal and vertical direction, and Detail H illustrates circular movement of target object 201 in 2D space within range of radar arrangement 900. FIG. 10 illustrates an example of a radar arrangement for gesture recognition in a 2D plane, according to an implementation. In the illustrated example, a radar arrangement 1000 includes a single element transmit antenna and a three element array 1031 for the receive antenna. Transmission and reception may be carried out simultaneously. In order to have a single reception chain at the receiver, in some implementations, we receive each of the received channel estimation packets in a different element in a consecutive order. In other implementations, in order to improve signal-to-noise ratio, several consecutive packets may be received at a single receive element before switching to the next element. The received observations for each element can be coherently combined to increase the signal-to-noise ratio provided that packets are transmitted fast enough.

Figure 11:
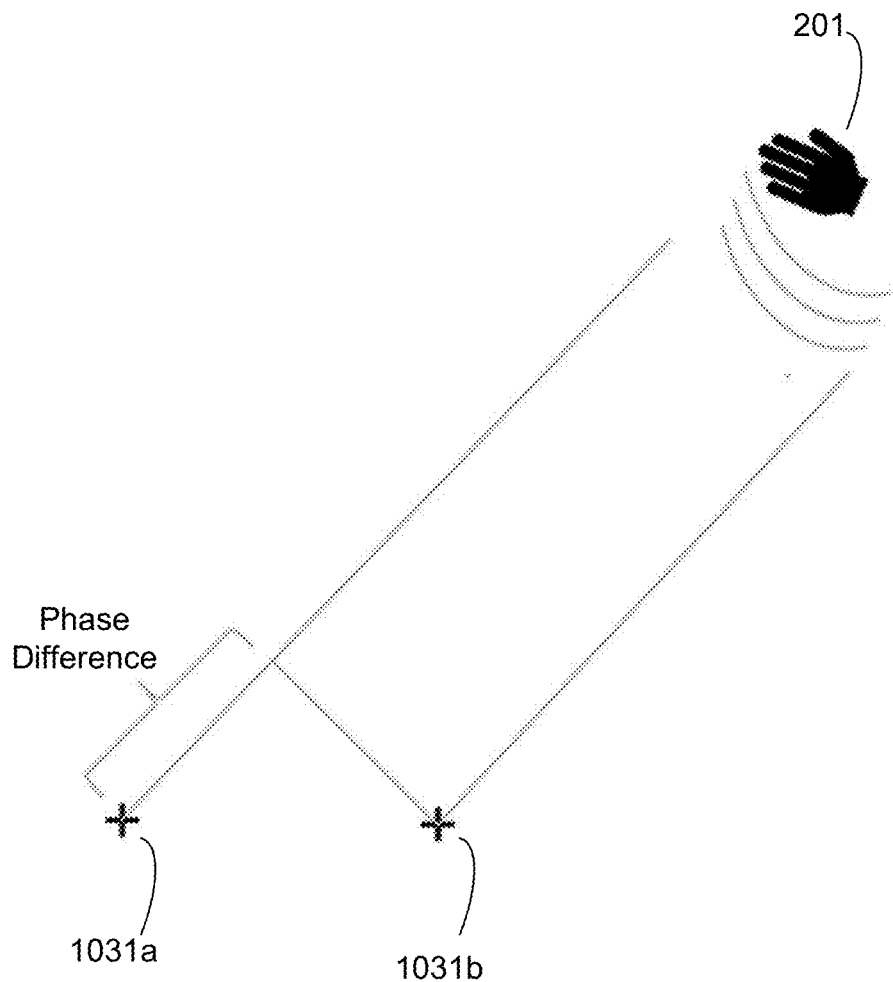
FIG. 11 illustrates an example of an interferometer measurement for a single pair of receiver elements, according to an implementation.

In some implementations, a gesture recognition algorithm is based on interferometer measurements in pairs. FIG. 11 illustrates an example of an interferometer measurement for a single pair of receiver elements, according to an implementation. An estimate of the angle of arrival is provided based on the phase difference of radiated signals reflected from target object 201, and received by Rx elements 1031a and 1031b. A closed form expression for the angle of arrival may be derived using techniques analogous to those used in the direction finding and radio-astronomy disciplines.

Referring again to FIG. 10, for the illustrated example implementation, we may obtain phase difference observations for two antenna element pairs, horizontal element pair (b, c) and a vertical element pair (a, b). For a specific gesture, it may be unnecessary to compute the exact angle of arrival, but instead obtain only the measurements of phase differences for the purposes of gesture recognition.

Figure 12:
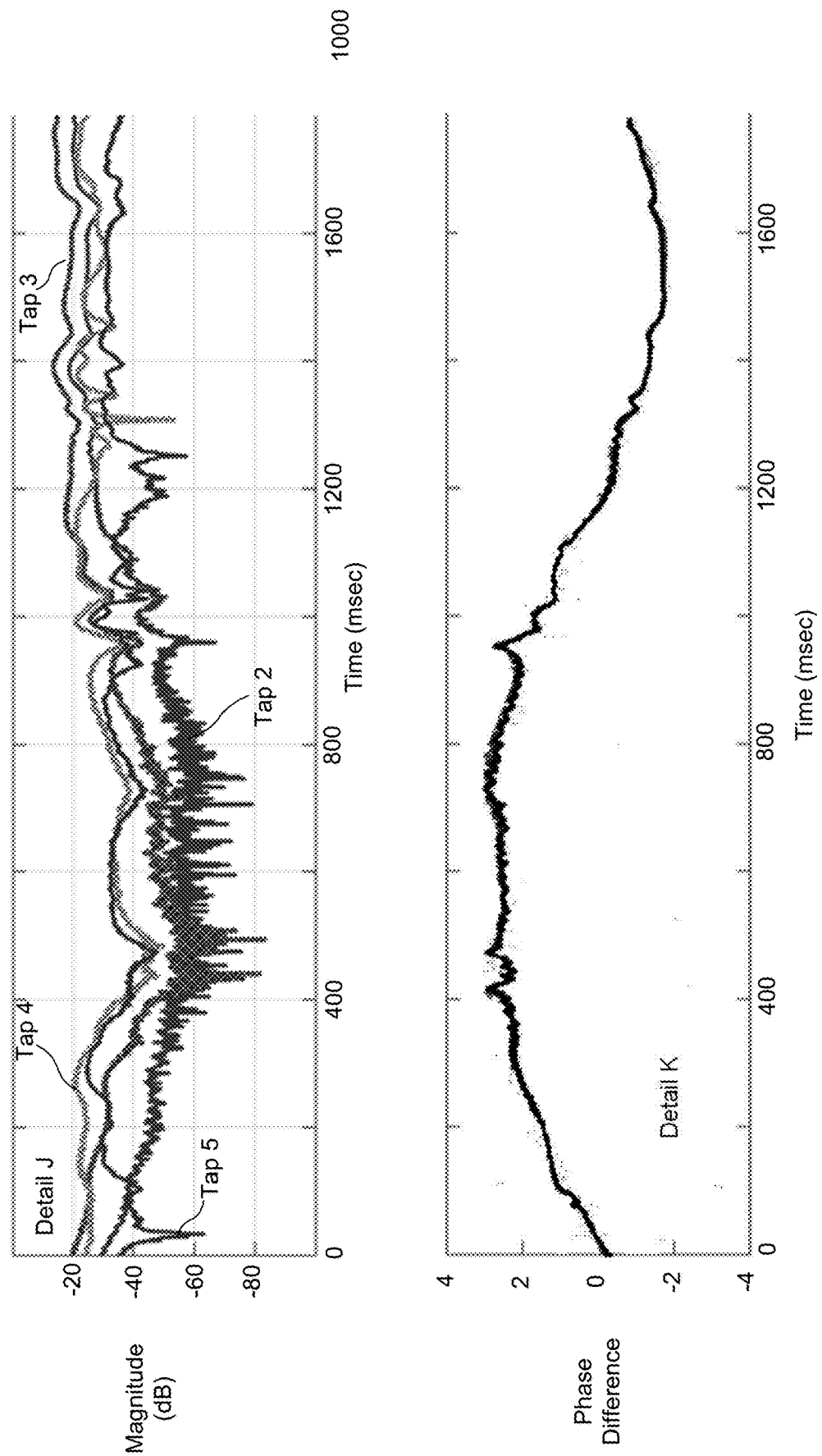
FIG. 12 illustrates an example of resulting tracking of general behavior of the phase differences, according to an implementation.

In some implementations, an algorithm provides an estimate to track the target object in the 2D space by applying Eq (1) where $s_t$ is redefined as the slope of a linear fit of the phase differences and the tracking is carried out in parallel for both the horizontal and vertical differences. Linear fit and median filtering may be applied for the phase difference slopes to mitigate target-instability. FIG. 12 illustrates an example of resulting tracking of general behavior of the phase differences, according to an implementation. The illustrated plots resulted from operation of an 802.11 ad/y standard-compatible networking chip set that operated with simultaneous receiving and transmitting RF chains for radar capabilities. Detail J shows the magnitude of signal received by one of the receiving antenna whereas Detail K shows the phase difference between the two receiving antennas are shown after performing a piece-wise linear-fit of median-filtered slopes. In each of the piece-wise linear-fit operations, the slope of the phase-difference that corresponds to the tap having the strongest magnitude (Detail J) was selected where magnitude is measured in one or both of the receiving antenna modules. It is noted that if accurate tracking is of interest, than exact angle of arrival may be calculated and provided to a more sophisticated, classic or modern tracking algorithms. However, this is not generally required for the present classification procedure.

In an example implementation, the classification algorithm may be based on computing the minimal enclosing ellipse for an interval of estimated tracked path in the 2D plane. Then the gesture may be classified based on a ratio of the ellipse axes. More specifically, where the minimal enclosing ellipse is given in an (x, y) plane by $$\frac{(x-c_1)^2}{a^2} + \frac{(y-c_2)^2}{b^2} = 1,$$

then the classification may be based on the ratio $$E_f = \frac{\max(a, b)}{\min(a, b)}.$$

Figure 13:
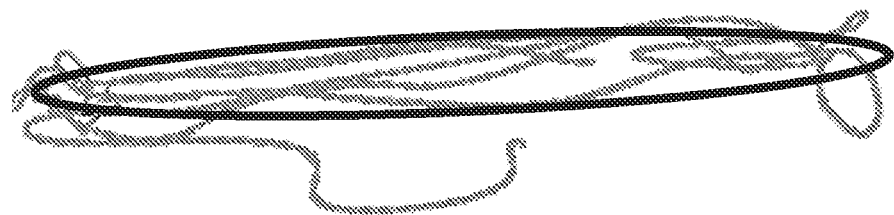
FIG. 13 illustrates an example of a tracked path in 2D and the enclosed ellipse generated for the case of linear movement, according to an implementation.
Figure 14:
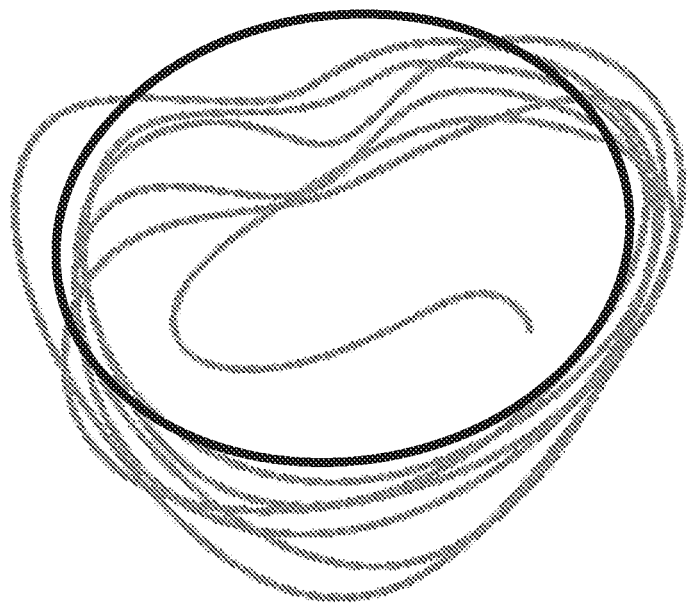
FIG. 14 illustrates an example of a tracked path in 2D and the enclosed ellipse generated for the case of circular movement, according to an implementation.

In the case of linear movement, there may be a substantial ratio between the axes, whereas, in the case of a circular gesture, the axes are similar. The inventors have found that circular movement may be reliably identified when $E_f \leq 2$ while linear movement may be reliably identified when $E_f \geq 3$. The foregoing simple rule has been found to capture a rather broad spectrum of linear and circular shapes to be counted as linear and circular while providing enough separation between the gestures to give reliable classification. The inventors have also found that user experience is well maintained even if the minimal enclosing ellipse is solved rather loosely (for purpose of simplifying/speeding computations). FIG. 13 illustrates an example of a tracked path in 2D and the enclosed ellipse generated for the case of linear movement, according to an implementation. FIG. 14 illustrates an example of a tracked path in 2D and the enclosed ellipse generated for the case of circular movement, according to an implementation. It may observed that the generated ellipse at hand is not enclosing the entire track of movement, this is a result of a rather loose solution for the optimization problem at hand.

Gesture Detection in Interspersed Radar and Network Traffic Signals

Particularly useful embodiments of the disclosure involve gesture detection in interspersed radar and network traffic signals. It may be advantageous to implement both gesture detection and communication of network traffic using millimeter wave technology. According to the present disclosure, the same transmit and receive hardware used for millimeter wave network data communications may be be re-used for millimeter wave gesture detection. Techniques are employed to ensure that millimeter wave gesture detection can be reliably achieved, e.g., sufficient signal to noise ratio (SNR) realized, even in the presence of millimeter wave network traffic.

One illustrative gesture is a "double-tap" gesture, in which two fingers of a user's hand are used to tap an electronic device or part of an electronic device, such as a screen on a mobile phone, in quick succession. While the double-tap gesture is illustrated below as an example, the same or similar techniques can be applied to detection of other types of gestures.

In one implementation, a test system is used to record both positive and negative samples (instances) of the double-tap gesture. The test system may be one illustrated by FIGS. 1 and 5, for example. In one realistic experiment, a user's hand is positioned approximately 30 cm from the millimeter wave radar transmitter and receiver, to perform both positive and negative samples. For each positive sample, the user performs an actual double-tap gesture while the test system performs a millimeter wave gesture detection, using techniques such as those described herein. Either a single double-tapping gesture or two consecutive double-tapping gestures may be performed by the user. The test system may record the captured gesture detection data in memory. For each negative sample, a user performs a gesture that is not a double-tap gesture, e.g., a general hand, palm, and/or finger movement, while the test system performs a millimeter wave gesture detection. Again, the test system may record the captured gesture detection data in memory. Here, memory may comprise, for example, buffer 537 in FIG. 5. The experiment may be summarized as follows:

Gesture recorded approximately 30 cm facing the radar TX and RX antennas

Double-tapping (Positive Samples)

General hand/palm/finger movements (Negative Samples)

Either a single or two events of double-tapping captured within the recording

Hand is present during all recording duration

Millimeter wave gesture detection may be based on burst radar signals. In one illustrative example, a burst is transmitted from the TX antenna every 1 msec. Each burst comprises 32 pulses, with pulses 10 microseconds apart, for a burst length of 0.3 msec. In one simple example, a single antenna configuration is used. For antennas having multiple elements, a particular antenna element may be used while other antenna elements may be ignored. For example, TX antenna element #16 and RX antenna element #16 may be used during all bursts and pulses. Output from certain taps may be recorded. For example, taps [17-19] may be recorded, while taps 6-8 corresponding to OTA leakage may be ignored. In this particular example, 5 seconds of gesture data may be recorded. This recorded data may comprise 5000 channel impulse responses (CIRs). As mentioned previously, each CIR may correspond to a burst. Thus, 5000 bursts, each having a 1 msec duration, may result in 5000 CIRs. Such an example is summarized below:

A burst every 1 msec

Each burst=32 pulses (10 usec apart, total 0.3 ms)

Single antenna configuration: TX antenna element #16 and RX antenna element #16 during all bursts and pulses (no BF used)

Taps [17-19] are recorded (Taps 6-8 from OTA leakage)

5 seconds are recorded (5000*32 CIRs)

Pre-processing may be performed to effectively increase SNR. One technique that may be employed is by summing up all the CIRs from a single burst to produce a single combined CIR. In the above example, 32 CIRs from a single burst may be combined to generate a single CIR. This provides a 15 dB SNR increase. Here, 10 microseconds is well within the coherence time of the target. Also, in this example, computation is further simplified by assuming that no leakage cancellation is carried (DC bin is removed). Furthermore, received radar signal is only taken from a single tap, e.g., tap #17, for sake of simplicity. It is noted that signals taken from adjacent taps were generally observed to be just as good. Also, no beamforming is used, again for sake of simplicity. Finally, two different data sets are processed, to compare the performance of (1) millimeter wave radar gesture detection radar in the presence of interspersed millimeter wave network traffic ("decimated" signal) vs. (2) continuous millimeter wave radar gesture detection. These conditions are summarized below:

32 CIRs form each burst are summed to provide a single CIR

No leakage cancellation is carried (DC bin is removed)

Only tap #17 is taken for analysis (adjacent taps were just as good)

No beamforming is used (single antenna)

Two data sets:
  (1) Decimated recording for 8 msec burst with 50% duty cycle (8 msec radar, 8 msec network traffic)
  (2) Continuous recording with CIR per 1 msec As will be shown in later sections, even though the test system is greatly simplified, results clearly show effective millimeter wave radar gesture detection radar in the presence of interspersed millimeter wave network traffic. Additional enhancements to performance may be achieved by employing more complicated features, such as employing beamforming, multiple taps, etc.

Figure 15:
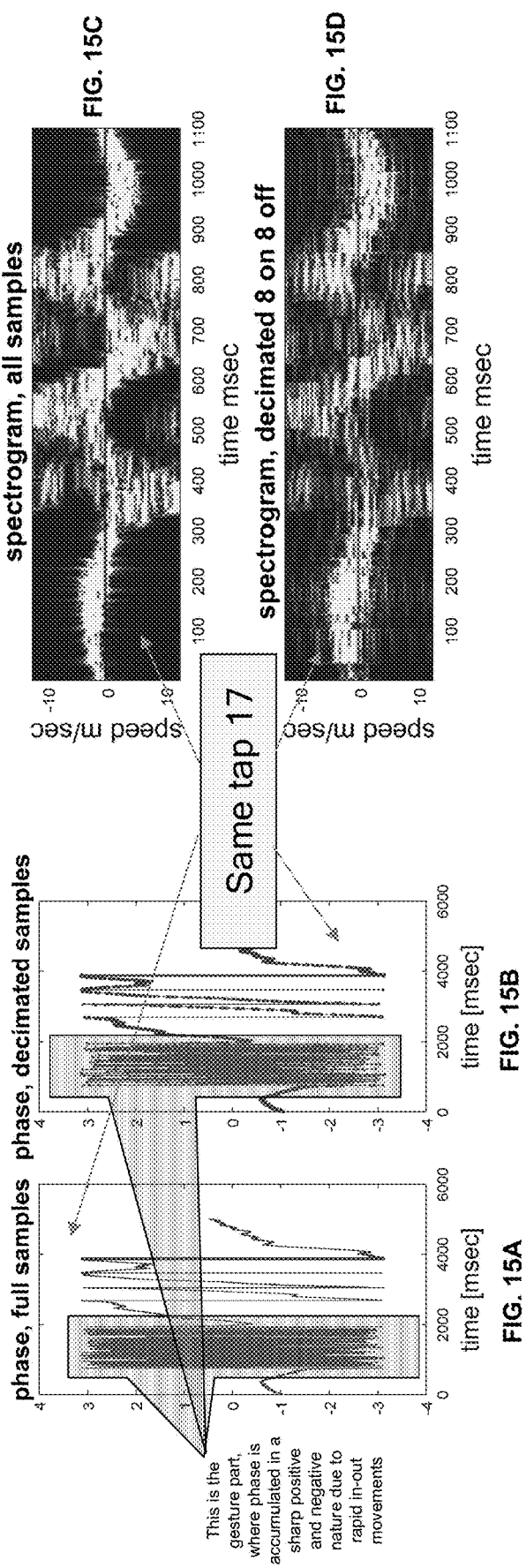
FIGS. 15A-15D illustrate a side-by-side comparison between (1) a decimated millimeter wave radar signal for detecting a gesture and (2) a continuous (non-decimated) millimeter wave radar signal for detecting the same gesture.

FIGS. 15A-15D illustrate a side-by-side comparison between (1) a decimated millimeter wave radar signal for detecting a gesture and (2) a continuous (non-decimated) millimeter wave radar signal for detecting the same gesture. FIG. 15A shows a time-domain plot of the phase of the received radar signal for a continuous (non-decimated) millimeter wave signal reflected off of the user's hand. Here, the x-axis depicts time in units of msec, and the y-axis depicts phase in units of radians. A box is draw over a duration of approximately 2000 msec, in which a "double-tap" gesture is being performed. As can be seen, the phase of the receive signal experiences sharp positive and negative values (e.g., amplitudes peaking at +π and −π radians), indicating rapid in-out movements associated with the double-tap gesture. FIG. 15B shows a time-domain plot of the phase of the received radar signal for a decimated millimeter wave signal reflected off of the user's hand during the same double-tap gesture. For example, this signal may comprise 8 msec of continuous recording (i.e., millimeter wave radar burst), followed by 8 msec with no recording (i.e., millimeter wave network traffic), which corresponds to a 50% duty cycle signal. It is worthwhile to note that the recorded signal is extremely prominent, and the gesture is clearly observed in both the continuous version and the decimated version of the received millimeter wave radar signal, indicating the feasibility of using the decimated radar signal, which supports interspersed network traffic, to support gesture detection. FIG. 15C is an example of a spectrogram and shows a frequency-domain plot of the phase of the received radar signal for a continuous (non-decimated) millimeter wave signal reflected off of the user's hand. FIG. 15C is a frequency-domain equivalent of the time-domain plot shown in FIG. 15A. Here, the x-axis depicts time in units of msec, and the y-axis depicts speed in units of meters per second (m/sec). FIG. 15D is an example of a spectrogram and shows a frequency-domain plot of the phase of the received radar signal for the decimated millimeter wave signal reflected off of the user's hand. FIG. 15D is a frequency-domain equivalent of the time-domain plot shown in FIG. 15B. The spectrograms shown in FIGS. 15C and 15D may be obtained by performing a transform on the time-domain radar signal. In the examples shown, a 64-length Fast Fourier Transform (FFT) with no windowing function is used. As shown in both FIGS. 15C and 15D, the strong positive and negative Doppler frequencies appear vividly in both the continuous (original) record (FIG. 15C) and the decimated version (FIG. 15D) of the spectrogram.

According to certain embodiments, gesture detection may be implemented using a spectrogram approach. In the example described above, the non-decimated received time-domain radar signal is received in N samples, taken 1 msec apart. This time-domain signal is converted to a signal-domain signal by applying a transform, in this case a 64-length FFT with no windowing. The samples are t, t−1, . . . , 5-63, for t=64:N. The decimated received time-domain signal, again, represents a 8 msec burst with 50% duty cycle (8 msec radar, 8 msec network traffic). Here, zero filling is employed to fill in the missing time-domain samples, then the same length-64 FFT (with no windowing) is applied. This results in an "on-off" modulation effect for the spectrum. However, the "on-off" modulation effect has no practical impact on the gesture spectral characterization. These details of the example are summarized below:

Non-decimated signal:
  N samples, 1 msec apart
  Take 64-length FFT (no window) for samples: t, t−1, . . . , t−63, for t=64:N Decimated signal for 8 msec burst with 50% duty cycle (8 msec radar, 8 msec network traffic):
  For spectrogram we take an approach of filling in zeros for the missing samples and then applying the same FFT computation
  This approach adds "on-off" modulation effect on the spectrum According to at least one embodiment of the disclosure, a machine learning (ML) technique based on the spectrograms is used for gesture detection. The ML classifier may be trained using spectrogram known to be associated with the targeted gesture—i.e., positive spectrograms, as well as spectrogram known to be associated with lack of the targeted gesture—i.e., negative spectrograms. Positive spectrograms may be obtained from radar signals received while a user's hand is performing a double-tap gesture, for example. Negative spectrograms may be obtained from radar signals received while a user's hand is performing general hand/palm/finger movements that are not double-tap gestures. Spectrogram data may be compressed using a compression technique, such as principle component analysis (PCA) to reduce dimensions. This can reduce storage and computational requirements. Also, different types of ML classifiers may be used, such as a bagged-tree classifier. The simplified machine-learning, spectrogram-based gesture detection technique described here yielded 96% accuracy. Performance may be further improved by using a greater number of samples in ML classifier training, etc. Details of the example machine learning classifier is summarized below.

Figure 16:
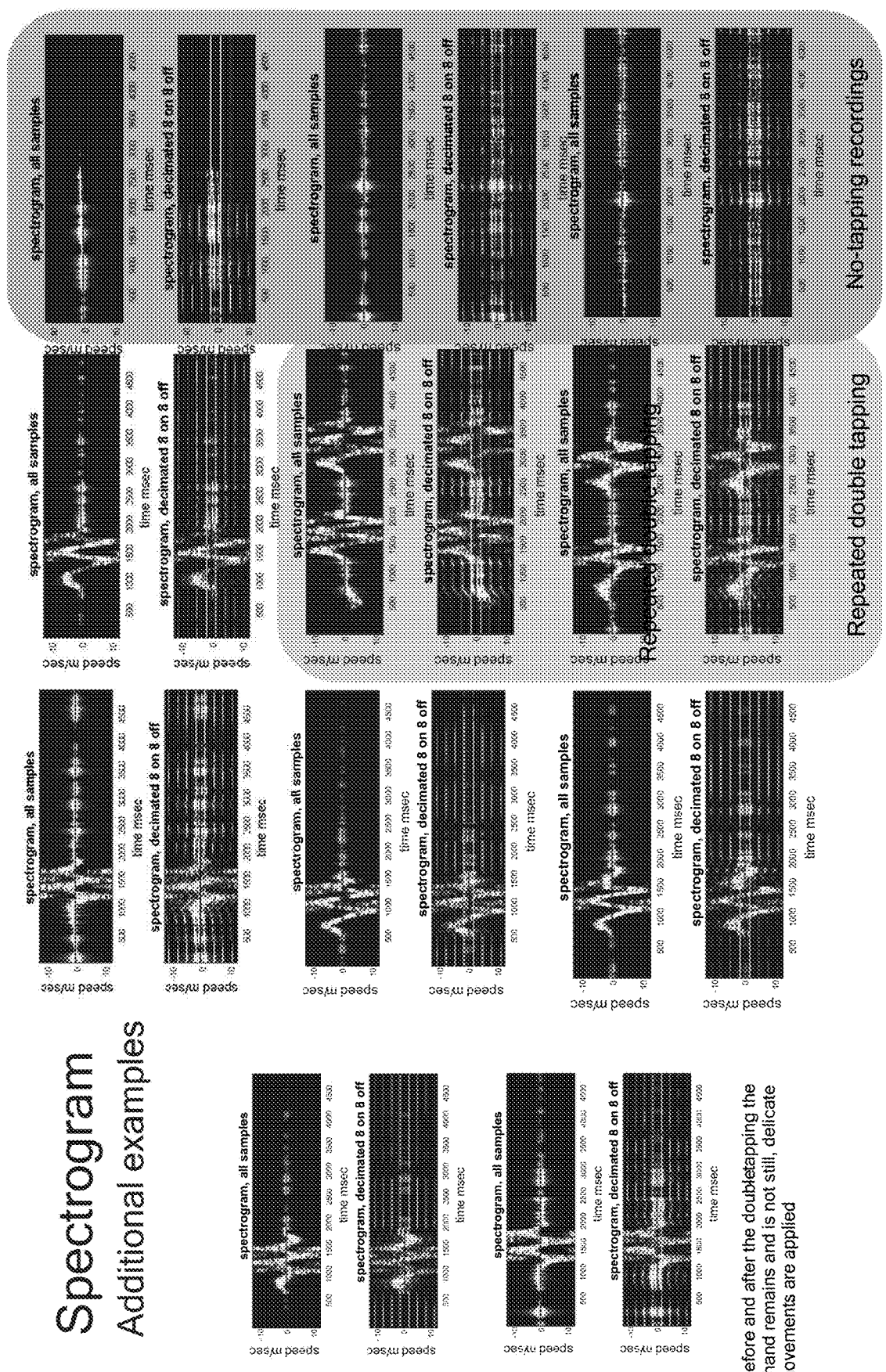
FIG. 16 illustrates additional examples of spectrograms generated in accordance with embodiments of the present disclosure.

Machine-learning classifier based on spectrogram images
25 positive and 25 negative spectrograms, each 500 msec
All data is processed via PCA to reduce dimensions
Ensemble bagged-tree classification showed results with 96% accuracy
Process is repeated for full samples and for decimated samples FIG. 16 illustrates additional examples of spectrograms generated in accordance with embodiments of the present disclosure. Note that four spectrograms labeled as "Repeated double tapping" are spectrograms which recorded of the user performing the double tapping gesture twice, in quick succession. These are positive samples. The twelve prior spectrograms (not labeled) are spectrograms recorded of the user performing the double tapping gesture once. These are also positive samples. The six spectrograms labeled as "no-tapping recordings" are spectrograms recorded of the user not performing any double-tapping gesture. Here, the user's hand may remain present and may not be still but instead is performing delicate movements.

According to certain embodiments, gesture detection may be implemented using an approach based on slope-estimation of the phase signal performed in the time domain. Just as an example, input to such a time-domain gesture detector may be in the form of sampled RX signal from the I and Q channels of a quadrature demodulator, obtained as a sequence of 500 samples spaced 1 msec apart. The output of the time-domain gesture detector may be positive or negative identification of a double-tapping gesture. The processing may involve first estimating a sequence of slopes of the phase of received signal. This may involve dividing the received signal into slope estimation intervals, which may be consecutive but disjoint intervals (e.g., 8 msec). Next, an unwrap operation maybe performed on the sequence of estimated slopes, to generate an unwrapped version of estimated slopes. Next, a linear fit operation may be performed to obtain a slope estimate for each slope estimation interval. A threshold may be established for determining positive versus negative slope. Using the threshold, the sequence of slope estimates maybe converted into slope polarities, each being positive ("+"), negative ("−"), or zero ("0"). Next, the sequence of slope polarities is checked for particular patterns, such as "+−+−" or "−+−+" and if such a pattern (with possible gaps within the provided signal, e.g., +0-+00-, up to reasonable interval) appears, then a positive gesture detection decision is reported. Otherwise a negative decision gesture detection decision is reported. This example of a slope-estimation gesture detector is summarized below:

Input: IQ samples of 0.5 sec, $\{y_t\}_{t=1}^N$, 500 samples 1 msec apart
Output: double-tapping identification
Processing:
Take the signal phase, $\{\theta_t = \text{angel}(y_t)\}_{t=1}^N$
Divide the signal to slope estimation intervals, consecutive but disjoint (8 msec), $\{(\theta_{8(t-1)+1}, \theta_{8(t-1)+1}, \ldots \theta_{8(t-1)+8})\}_{t=1}^{N/8}$
Unwrap the phase for each interval $\{(\theta'_{8(t-1)+1}, \theta'_{8(t-1)+1}, \ldots, \theta'_{8(t-1)+8}) = \text{unwrap}(\theta_{8(t-1)+1}, \theta_{8(t-1)+1}, \ldots, \theta_{8(t-1)+8})\}_{t=1}^{N/8}$
Compute linear fit slope for the unwrapped phase at each interval $\{a_t = \text{slope}((\theta'_{8(t-1)+1}, \theta'_{8(t-1)+1}, \ldots \theta'_{8(t-1)+8}))\}_{t=1}^{N/8}$
Check for slope threshold crossing
Crossing of positive threshold $a_t > T$, is marked with +
Crossing of negative threshold $a_t < -T$ is marked with −
Otherwise mark 0
Check for crossing pattern +−+− or −+−+, if such pattern (with possible gaps within the provided signal, e.g., +0-+00-, up to reasonable interval) appears, then report positive decision, otherwise report negative decision
Not very sensitive to the off cycle duration.

Figure 17:
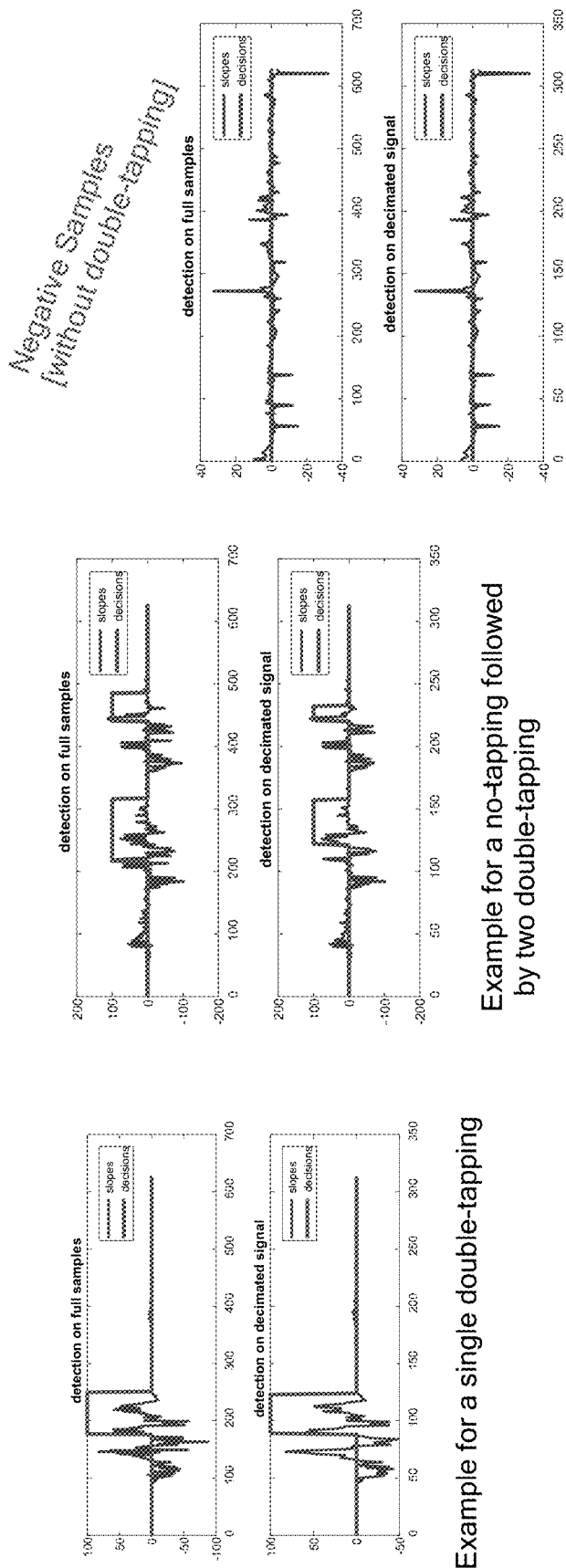
FIG. 17 illustrates samples of positive and negative double tapping gestures accurately detected by the slope-estimation, time-domain based technique described above.

FIG. 17 illustrates samples of positive and negative double tapping gestures accurately detected by the slope-estimation, time-domain based technique described above. The technique is also referred to as the classic detection technique. The technique provided correct decisions on all 25 positive and 25 negative examples of the double tap gesture described previously. For each case (positive or negative sample), both the computed slope and the gesture detection decision are plotted against time. A moving window is applied to generate these results.

Referring to FIG. 17, two examples are shown on the left and labeled as "Example for a single double-tapping." Here, both examples are single double-tapping gestures. As shown, the time-domain based technique accurately detected the double-tapping gesture. Two examples are shown in the middle and labeled as "Example of a no-tapping followed by two double-tapping." Here both examples start as no tapping, followed by the double-tapping gesture performed twice in succession. Two examples are shown on the right of the figure and labeled as "Negative samples [without double-tapping]." Here both examples recorded received signals during which the user performed no double-tapping gesture.

Figure 18:
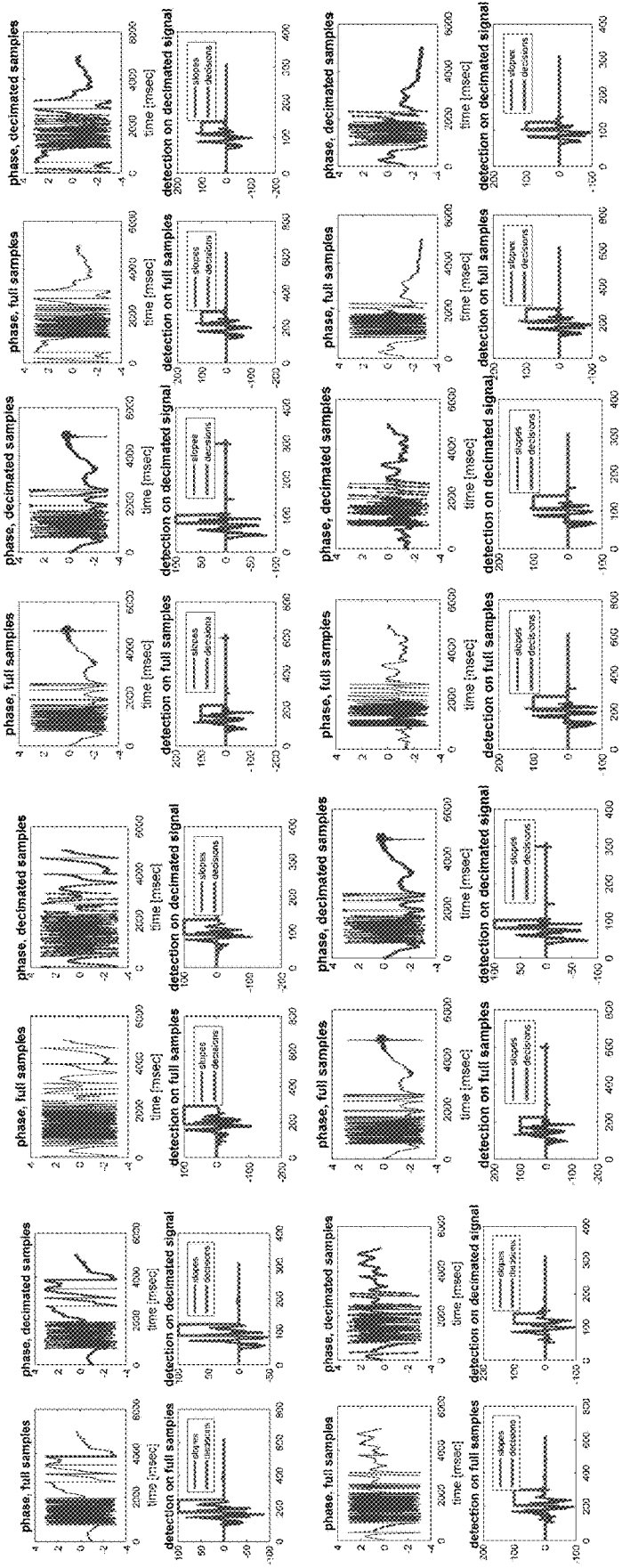
FIG. 18 illustrates additional examples of "positive" double-tapping detection using the time-domain technique (user performs double-tapping gesture).
Figure 19:
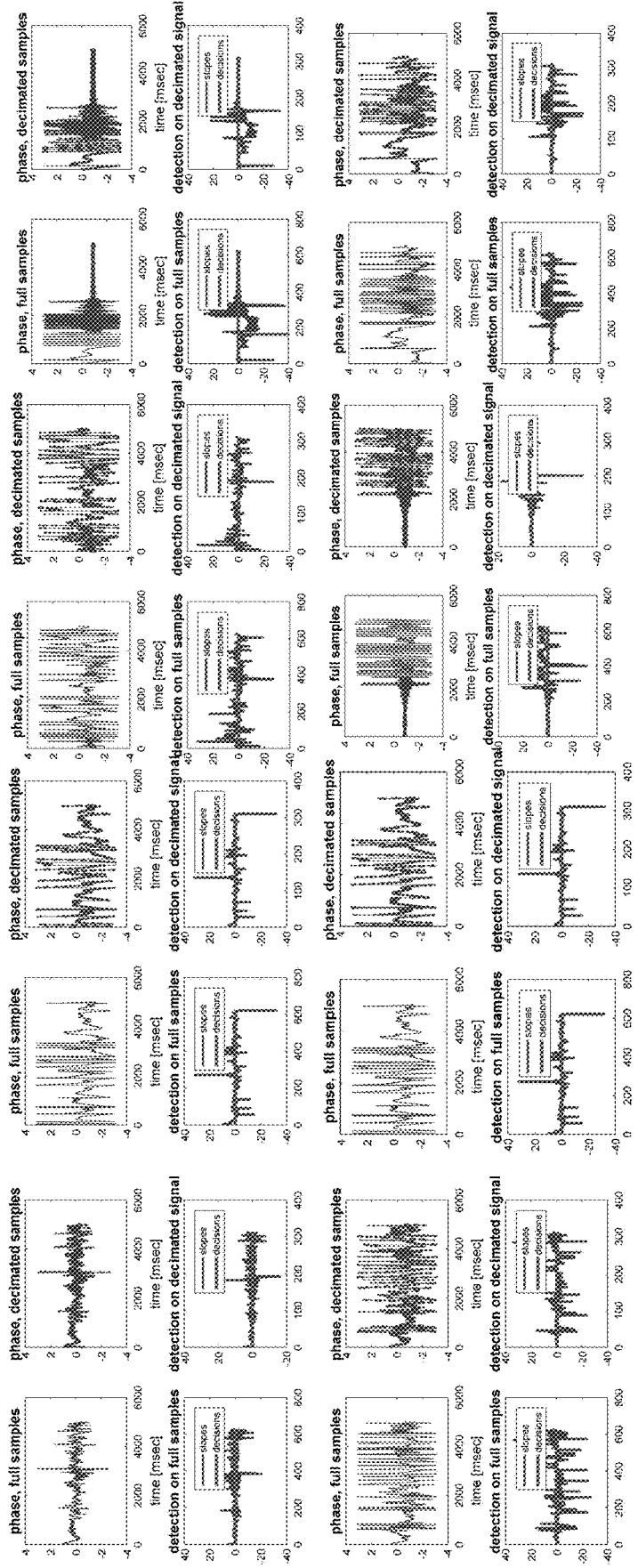
FIG. 19 illustrates additional examples of "negative" double-tapping detection using the same time-domain technique (user does not perform any double-tapping gesture).

FIG. 18 illustrates additional examples of "positive" double-tapping detection using the time-domain technique (user performs double-tapping gesture). FIG. 19 illustrates additional examples of "negative" double-tapping detection using the same time-domain technique (user does not perform any double-tapping gesture).

According to various embodiments described above, gesture detection may be performed on decimated signals in which millimeter wave signals for radar-based gesture detection are interspersed with millimeter wave signals for data communications, i.e., network traffic. For example, double-tapping gesture detection is evaluated in real time records, e.g., 5 seconds of received radar signals. It is demonstrated that key characteristics of the gesture may be present in both full samples (non-decimated) as well as an interspersed (decimated) signal, e.g., 8 msec "on" and 8 msec "off" millimeter wave radar signal for gesture detection. Two categories of detection schemes—frequency-domain and time-domain Both frequency and time-domain detection techniques are illustrated. Frequency-domain techniques include machine learning (ML) classifiers based on PCA-reduced spectrograms. Time-based techniques include a phase detector scheme based on patterns of phase polarities.

Thus, improved techniques for gesture recognition using mm wave radar signals produced by RF antennas compatible with 802.11 wi-fi protocols been described. It will be appreciated that a number of alternative configurations and fabrication techniques may be contemplated.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by or to control the operation of data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that can be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, as a person having ordinary skill in the art will readily appreciate, the terms "upper" and "lower", "top" and "bottom", "front" and "back", and "over", "on", "under" and "underlying" are sometimes used for ease of describing the figures and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

What is claimed is:

1. A method of gesture recognition comprising:
   performing gesture recognition and network data communications using an electronic device, the electronic device having both a radar capability and a wireless communications capability based on millimeter wave signals, the electronic device including at least one transmit antenna and at least one receive antenna that are operable in one or more frequency ranges greater than 20 GHz,
   wherein the performing gesture recognition includes:
      simultaneously operating of the at least one transmit antenna and the at least one receive antenna so as to provide the radar capability, including receiving millimeter wave signals using the at least one receive antenna during a first portion of a time frame;
      detecting a presence and a motion of a reflective object by analyzing at least phase of millimeter wave signals received by the at least one receive antenna and resultant from reflection of signals transmitted by the at least one transmit antenna by the reflective object; and
      outputting a recognized gesture,
   wherein the performing network data communications includes:
      receiving millimeter wave signals using the at least one receive antenna during a second portion of the time frame; and
      demodulating and decoding the millimeter wave signals received during the second portion of the time frame to generate data bits,
   wherein the first portion of the time frame comprises a first plurality of non-contiguous time periods for receiving signals for gesture recognition,
   wherein the second portion of the time frame comprises a second plurality of non-contiguous time periods for receiving signals for network data communications, and
   wherein the first plurality of non-contiguous time periods of the time frame is interspersed with the second plurality of non-contiguous time periods of the time frame.

2. The method of claim 1, wherein millimeter wave signals received during at least one of the first plurality of non-contiguous time periods comprises a burst of pulses.

3. The method of claim 2, wherein the analyzing at least phase of the millimeter wave signals comprises combining multiple pulses in the burst of pulses to generate a combined channel impulse response (CIR).

4. The method of claim 3, where the analyzing at least phase of the millimeter wave signals further comprises a frequency-based analysis, including:
   applying a transform operation to the combined CIR to generate a spectrogram;
   providing the spectrogram to a trained machine learning (ML) classifier; and
   obtaining the recognized gesture from the trained ML classifier.

5. The method of claim 4, wherein the applying the transform operation comprises performing a Fast Fourier Transform (FFT) operation on the CIR to generate the spectrogram.

6. The method of claim 3, where the analyzing at least phase of millimeter wave signals further comprises a time-based analysis, including:
   generating an estimated slope reflecting a rate of change of phase based on the combined CIR;
   comparing the estimated slope to a threshold; and
   determining a pattern of slope polarities based on the comparing the estimated slope to the threshold; and
   generating the recognized gesture based on the pattern of the slope polarities.

7. The method of claim 1, wherein the performing gesture recognition includes recognizing a double tap gesture.

8. The method of claim 1, wherein the at least one transmit antenna and at least one receive antenna are compatible with one or both of IEEE 802.11ad and IEEE 802.11ay wi-fi protocols.

9. The method of claim 1, wherein each of the at least one transmit antenna and the at least one receive comprises a plurality of antenna elements.

10. The method of claim 1, wherein the reflective object is one or more of a hand or other appendage of a user, or a hand held object.

11. The method of claim 1, wherein the signals transmitted by the at least one transmit antenna include two complementary Golay sequences used as two sequential radar pulses.

12. The method of claim 1, wherein one or both of the at least one transmit antenna and the at least one receive antenna are operable in a 60 GHz band.

13. The method of claim 1, further comprising executing a graphical user interface (GUI) operation, responsive to the recognized gesture.

14. An apparatus comprising:
   a processor and an electronic device having both a radar capability and a wireless communications capability based on millimeter wave signals, the electronic device including at least one transmit antenna and at least one receive antenna that are operable in one or more frequency ranges greater than 20 GHz;
   wherein the processor is configured to perform gesture recognition with the electronic device by:
      simultaneously operating the at least one transmit antenna and the at least one receive antenna so as to provide the radar capability, including receiving millimeter wave signals using the at least one receive antenna during a first portion of a time frame;

detecting a presence and a motion of a reflective object by analyzing at least phase of millimeter wave signals received by the at least one receive antenna and resultant from reflection of signals transmitted by the at least one transmit antenna and reflected by the reflective object; and outputting a recognized gesture, wherein the processor is further configured to perform network data communications with the electronic device by:

receiving millimeter wave signals using the at least one receive antenna during a second portion of the time frame; and demodulating and decoding the millimeter wave signals received during the second portion of the time frame to generate data bits, wherein the first portion of the time frame comprises a first plurality of non-contiguous time periods for receiving signals for gesture recognition, wherein the second portion of the time frame comprises a second plurality of non-contiguous time periods for receiving signals for network data communications, and wherein the first plurality of non-contiguous time periods of the time frame is interspersed with the second plurality of non-contiguous time periods of the time frame.

15. The apparatus of claim 14, wherein millimeter wave signals received during at least one of the first plurality of non-contiguous time periods comprises a burst of pulses.

16. The apparatus of claim 15, wherein the analyzing at least phase of millimeter wave signals comprises combining multiple pulses in the burst of pulses to generate a combined channel impulse response (CIR).

17. The apparatus of claim 16, where the analyzing at least phase of millimeter wave signals further comprises a frequency-based analysis, including:

applying a transform operation to the combined CIR to generate a spectrogram;

providing the spectrogram to a trained machine learning (ML) classifier; and obtaining the recognized gesture from the trained ML classifier.

18. The apparatus of claim 17, wherein the applying the transform operation comprises performing a Fast Fourier Transform (FFT) operation on the CIR to generate the spectrogram.

19. The apparatus of claim 16, where the analyzing at least phase of millimeter wave signals further comprises a time-based analysis, including:

generating an estimated slope reflecting a rate of change of phase based on the combined CIR;

comparing the estimated slope to a threshold; and determining a pattern of slope polarities based on the comparing the estimated slope to the threshold; and generating the recognized gesture based on the pattern of the slope polarities.

20. The apparatus of claim 14, wherein the performing gesture recognition includes recognizing a double tap gesture.

21. The apparatus of claim 14, wherein the at least one transmit antenna and at least one receive antenna are compatible with one or both of IEEE 802.11ad and IEEE 802.1lay wi-fi protocols.

22. The apparatus of claim 14, wherein each of the at least one transmit antenna and the at least one receive antenna comprises a plurality of antenna elements.

23. The apparatus of claim 14, wherein the reflective object is one or more of a hand or other appendage of a user, or a hand held object.

24. The apparatus of claim 14, wherein the signals transmitted by the at least one transmit antenna include two complementary Golay sequences used as two sequential radar pulses.

25. The apparatus of claim 14, wherein one or both of the at least one transmit antenna and the at least one receive antenna are operable in a 60 GHz band.

26. The apparatus of claim 14, further comprising executing a graphical user interface (GUI) operation, responsive to the recognized gesture.

27. A non-transitory computer readable medium storing program code to be executed by a processor, the program code comprising instructions configured to cause the processor to:

perform gesture recognition and network data communications using an electronic device, the electronic device having both a radar capability and a wireless communications capability based on millimeter wave signals, the electronic device including at least one transmit antenna and at least one receive antenna that are operable in one or more frequency ranges greater than 20 GHz, wherein the perform gesture recognition includes:

simultaneously operating of the at least one transmit antenna and the at least one receive antenna so as to provide the radar capability, including receiving millimeter wave signals using the at least one receive antenna during a first portion of a time frame;

detecting a presence and a motion of a reflective object by analyzing at least phase of millimeter wave signals received by the at least one receive antenna and resultant from reflection of signals transmitted by the at least one transmit antenna by the reflective object; and outputting a recognized gesture, wherein the performing network data communications includes:

receiving millimeter wave signals using the at least one receive antenna during a second portion of the time frame; and demodulating and decoding the millimeter wave signals received during the second portion of the time frame to generate data bits, wherein the first portion of the time frame comprises a first plurality of non-contiguous time periods for receiving signals for gesture recognition, wherein the second portion of the time frame comprises a second plurality of non-contiguous time periods for receiving signals for network data communications, and wherein the first plurality of non-contiguous time periods of the time frame is interspersed with the second plurality of non-contiguous time periods of the time frame.

28. An apparatus comprising:

a processor and an electronic device having both a radar capability and a wireless communications capability based on millimeter wave signals, the electronic device including at least one transmit antenna and at least one receive antenna that are operable in one or more frequency ranges greater than 20 GHz;

means for performing gesture recognition with the electronic device by:
- simultaneously operating the at least one transmit antenna and the at least one receive antenna so as to provide the radar capability, including receiving millimeter wave signals using the at least one receive antenna during a first portion of a time frame;
- detecting a presence and a motion of a reflective object by analyzing at least phase of millimeter wave signals received by the at least one receive antenna and resultant from reflection of signals transmitted by the at least one transmit antenna by the reflective object; and
- outputting a recognized gesture, and means for performing wireless communications with the electronic device by:
  - receiving millimeter wave signals using the at least one receive antenna during a second portion of the time frame; and
  - demodulating and decoding the millimeter wave signals received during the second portion of the time frame to generate data bits,
- wherein the first portion of the time frame comprises a first plurality of non-contiguous time periods for receiving signals for gesture recognition,
- wherein the second portion of the time frame comprises a second plurality of non-contiguous time periods for receiving signals for network data communications, and
- wherein the first plurality of non-contiguous time periods of the time frame is interspersed with the second plurality of non-contiguous time periods of the time frame.

* * * * *